(12) United States Patent
Takahashi et al.

(10) Patent No.: US 12,027,934 B2
(45) Date of Patent: Jul. 2, 2024

(54) VIBRATION ACTUATOR AND ELECTRONIC DEVICE WITH VENT HOLE

(71) Applicants: Yuki Takahashi, Tokyo (JP); Chikara Sekiguchi, Tokyo (JP); Shigeyuki Shimomura, Tokyo (JP); Yoshihiro Kumanomido, Tokyo (JP); Daisuke Kodama, Tokyo (JP); Yuta Yoshii, Tokyo (JP); Shigenori Inamoto, Tokyo (JP)

(72) Inventors: Yuki Takahashi, Tokyo (JP); Chikara Sekiguchi, Tokyo (JP); Shigeyuki Shimomura, Tokyo (JP); Yoshihiro Kumanomido, Tokyo (JP); Daisuke Kodama, Tokyo (JP); Yuta Yoshii, Tokyo (JP); Shigenori Inamoto, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 307 days.

(21) Appl. No.: 16/894,802

(22) Filed: Jun. 7, 2020

(65) Prior Publication Data
US 2020/0389078 A1    Dec. 10, 2020

(30) Foreign Application Priority Data

Jun. 7, 2019  (JP) ................................ 2019-107369
Jan. 31, 2020  (JP) ................................ 2020-015485

(51) Int. Cl.
*H02K 33/18* (2006.01)
*B06B 1/04* (2006.01)
*H02K 33/12* (2006.01)

(52) U.S. Cl.
CPC ............. *H02K 33/18* (2013.01); *H02K 33/12* (2013.01); *B06B 1/045* (2013.01)

(58) Field of Classification Search
CPC ........ B06B 1/045; H02K 33/00; H02K 35/00; H02K 35/02; H02K 33/02; H02K 33/16;
(Continued)

(56) References Cited

U.S. PATENT DOCUMENTS 4,719,883 A * 1/1988 Yokoyama .............. F02P 7/021
200/19.32
2004/0093684 A1* 5/2004 Park ...................... A47L 9/1666
15/347

(Continued)

FOREIGN PATENT DOCUMENTS

CN    105720774    6/2016
JP    09-172750    6/1997
(Continued)

OTHER PUBLICATIONS

Kobayashi (JP 2003300013 A) English Translation (Year: 2003).*
(Continued)

*Primary Examiner* — Tulsidas C Patel
*Assistant Examiner* — Robert E Mates

(57) ABSTRACT

A vibration actuator includes: a fixing body including a hollow case and a coil, a movable body that includes a magnet, and an elastic supporting part that supports the movable body such that the movable body is freely movable with respect to the fixing body in the hollow case. The hollow case restricts a movement range of the movable body in the case by opposite end surface portions that are disposed to face each other at a distance from each other in the vibration direction of the movable body, the hollow case includes one or more vent holes, and the vent holes are disposed in a portion of at least one end surface portion of the opposite end surface portions, the portion being free from interference by the movable body.

10 Claims, 17 Drawing Sheets

(58) Field of Classification Search
CPC ........ H02K 33/04; H02K 33/06; H02K 33/08; H02K 33/10; H02K 33/12; H02K 33/14
See application file for complete search history.

(56) References Cited

U.S. PATENT DOCUMENTS

| | | | |
|---|---|---|---|
| 2005/0194387 A1* | 9/2005 | Banks | A61L 2/26 220/372 |
| 2007/0108851 A1* | 5/2007 | Hashiba | H02K 1/2786 310/58 |
| 2010/0229835 A1* | 9/2010 | Tarancioglu | F04C 11/00 123/497 |
| 2014/0158788 A1* | 6/2014 | Mikkelsen | A61L 9/12 239/6 |
| 2014/0292163 A1 | 10/2014 | Lau et al. | |
| 2015/0286256 A1* | 10/2015 | Delano | G06F 1/203 361/679.48 |
| 2016/0172950 A1 | 6/2016 | Shim et al. | |
| 2017/0328441 A1* | 11/2017 | Kanaya | B60K 5/1208 |

FOREIGN PATENT DOCUMENTS

| | | | |
|---|---|---|---|
| JP | 09-275671 | | 10/1997 |
| JP | 11-262234 | | 9/1999 |
| JP | 2003-163981 | | 6/2003 |
| JP | 2003-300013 | | 10/2003 |
| JP | 2003300013 A | * | 10/2003 |
| JP | 3748637 | | 2/2006 |
| JP | 2013-106411 | | 5/2013 |
| JP | 2013-126299 | | 6/2013 |
| JP | 2014-193112 | | 10/2014 |
| JP | 2016-013554 | | 1/2016 |
| JP | 2016-538821 | | 12/2016 |
| JP | 2019-068521 | | 4/2019 |
| KR | 10-1083146 | | 11/2011 |
| KR | 10-1418410 | | 8/2014 |

OTHER PUBLICATIONS

European Search Report and the European Search Opinion dated Nov. 3, 2020 From the European Patent Office Re. Application No. 20178499.8. (7 Pages).

* cited by examiner

VIBRATION ACTUATOR AND ELECTRONIC DEVICE WITH VENT HOLE

CROSS REFERENCE TO RELATED APPLICATIONS

This application is entitled to (or claims) the benefit of Japanese Patent Application No. 2019-107369, filed on Jun. 7, 2019, and Japanese Patent Application No. 2020-015485, filed on Jan. 31, 2020, the disclosure of which including the specification, drawings and abstract is incorporated herein by reference in its entirety.

TECHNICAL FIELD

The present invention relates to a vibration actuator and an electronic device including the vibration actuator.

BACKGROUND ART

Conventionally, a vibration actuator is mounted as a vibration source in electronic devices having a vibration function. The electronic devices can notify a user of an incoming call or improve an operational feel and/or realism by driving the vibration actuator to transmit vibrations to the user to give a physical feeling. Here, examples of the electronic devices include a portable game terminal, a controller (game pad) of a stationary game machine, a portable communication terminal such as a mobile phone or a smart phone, a portable information terminal such as a tablet PC, and a portable device such as a wearable terminal capable of being worn on clothes or an arm.

A vibration actuator used in a pager or the like as disclosed in Patent Literature (hereinafter, referred to as "PTL") 1 has been known as a vibration actuator of a miniaturizable structure mounted on a portable device, for example.

This vibration actuator includes a pair of plate-like elastic bodies that are supported respectively on opening edge portions of a cylindrical frame such that the elastic bodies face each other. In addition, in this actuator, a yoke fitted with a magnet is fixed to a raised central whirl-shaped portion of one of the pair of plate-like elastic bodies, and the yoke is supported inside the frame.

The yoke, together with the magnet, forms a magnetic field generator, and a coil attached to the other plate-like elastic body is disposed in the magnetic field of this magnetic field generator. The pair of plate-like elastic bodies are selectively resonated to generate vibrations by application of switched currents of different frequencies through an oscillation circuit to the coil, so that the yoke vibrates in the center-line direction of the frame within the frame. PTL 1 also discloses another embodiment in which a fixing body is provided with a shaft on which the movable body slides to move in the vibration direction, and the shaft prevents the yoke being the movable body from colliding with the inner circumferential surface of the frame even when the vibration actuator is externally impacted.

CITATION LIST

Patent Literature

PTL 1: JP Patent No. 3,748,637

SUMMARY OF INVENTION

Technical Problem

Meanwhile, in order to prevent foreign matter such as dust from entering a range in which the movable body vibrates, it is common in the conventional vibration actuator that the movable body is vibrated in a space that is closed as much as possible by a housing or the like surrounding the movable body.

However, there is a problem that, when the movable body is vibrated in a sealed space, the air compressed in the housing due to the vibration increases the pressure inside the housing depending on the magnitude of the vibration of the movable body, so that the vibration of the movable body is damped and the ability of vibrational expression of the vibration actuator itself is reduced.

An object of the present invention is to provide a vibration actuator and an electronic device which generate a suitable tactile vibration at high output while preventing entry of foreign matter such as dust without damping the vibration.

Solution to Problem

In order to achieve the above-mentioned object, the present invention employs a configuration of a vibration actuator in which the vibration actuator includes:
 a fixing body including a hollow case and a coil disposed in the hollow case;
 a movable body that includes a magnet disposed inside the coil in a radial direction of the coil, and is disposed to be freely movable in the hollow case in a vibration direction orthogonal to the radial direction; and
 an elastic supporting part that supports the movable body such that the movable body is freely movable with respect to the fixing body in the hollow case, in which
 cooperation between the coil and the magnet causes the movable body to vibrate with respect to the fixing body,
 the hollow case restricts a movement range of the movable body in the hollow case by opposite end surface portions that are disposed to face each other at a distance from each other in the vibration direction of the movable body,
 the hollow case includes one or more vent holes,
 the one or more vent holes are disposed in a portion of at least one end surface portion of the opposite end surface portions, the portion being free from interference by the movable body.

In addition, one aspect of the vibration actuator of the present invention employs a configuration in which the vibration actuator includes:
 a fixing body including a hollow case and a coil disposed in the hollow case;
 a movable body that includes a magnet disposed inside the coil in a radial direction of the coil, and is disposed to be freely movable in the hollow case in a vibration direction orthogonal to the radial direction;
 an elastic supporting part that supports the movable body such that the movable body is freely movable with respect to the fixing body in the hollow case, in which cooperation between the coil and the magnet causes the movable body to vibrate with respect to the fixing body, the hollow case restricts a movement range of the movable body in the hollow case by opposite end surface portions that are disposed to face each other at a distance from each other in the vibration direction of the movable body, the hollow case includes one or more vent holes, the one or more vent holes are formed in a portion of at least one end surface portion of the opposite end surface portions, the portion overlapping with an outer circumferential portion of the elastic supporting part in the vibration direction.

Further, one aspect of an electronic device of the present invention employs a configuration in which the vibration actuator with the above-described configuration is mounted in the electronic device.

Advantageous Effects of Invention

According to the present invention, it is possible to generate a suitable tactile vibration at high output while preventing the entry of foreign matter such as dust without damping the vibration.

DESCRIPTION OF EMBODIMENTS

Hereinafter, embodiments of the present invention will be described in detail with reference to the drawings.

[Entire Configuration of Vibration Actuator]

Figure 1:
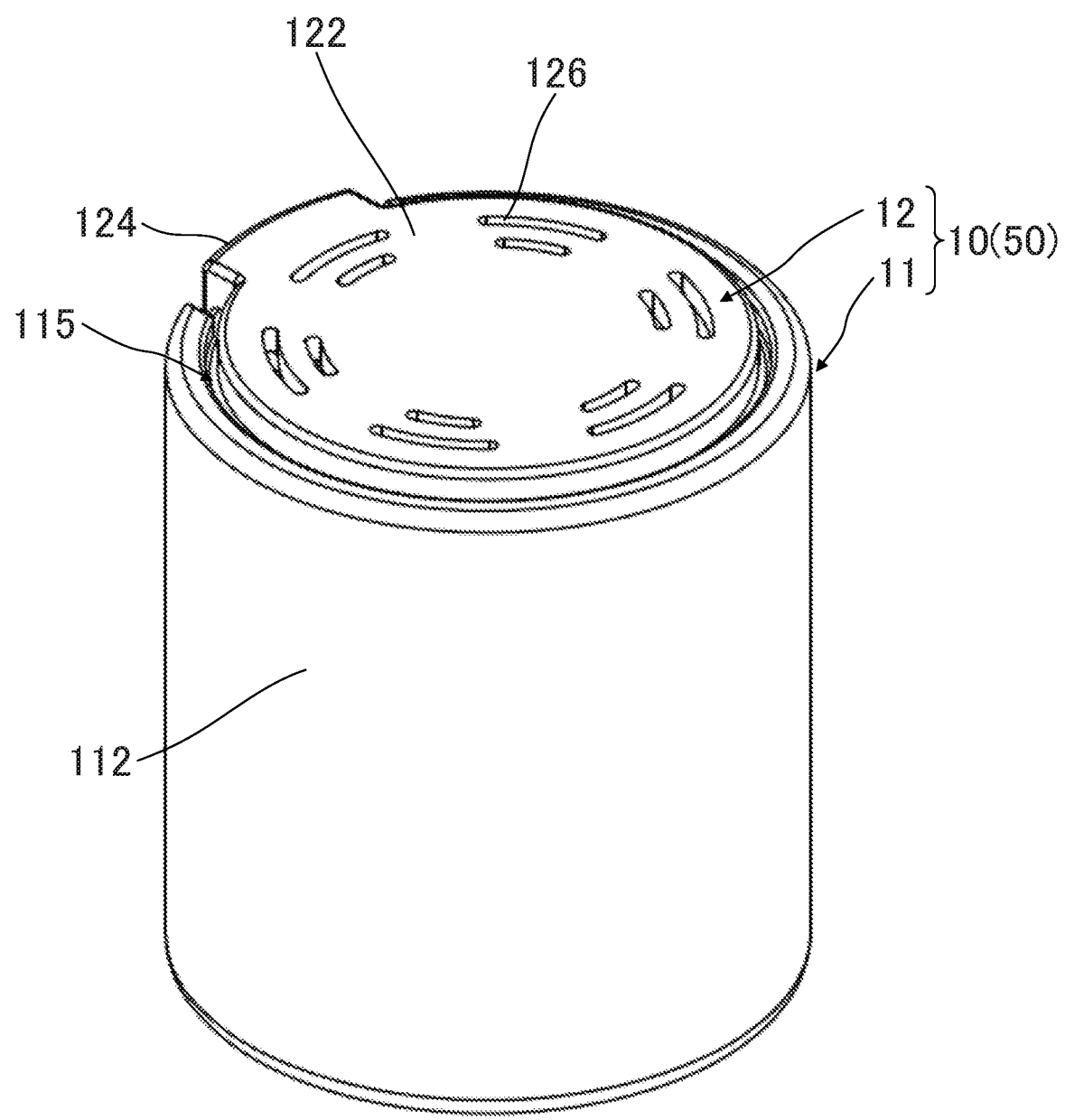
FIG. 1 is an external perspective view of a vibration actuator according to an embodiment of the present invention.
Figure 2:
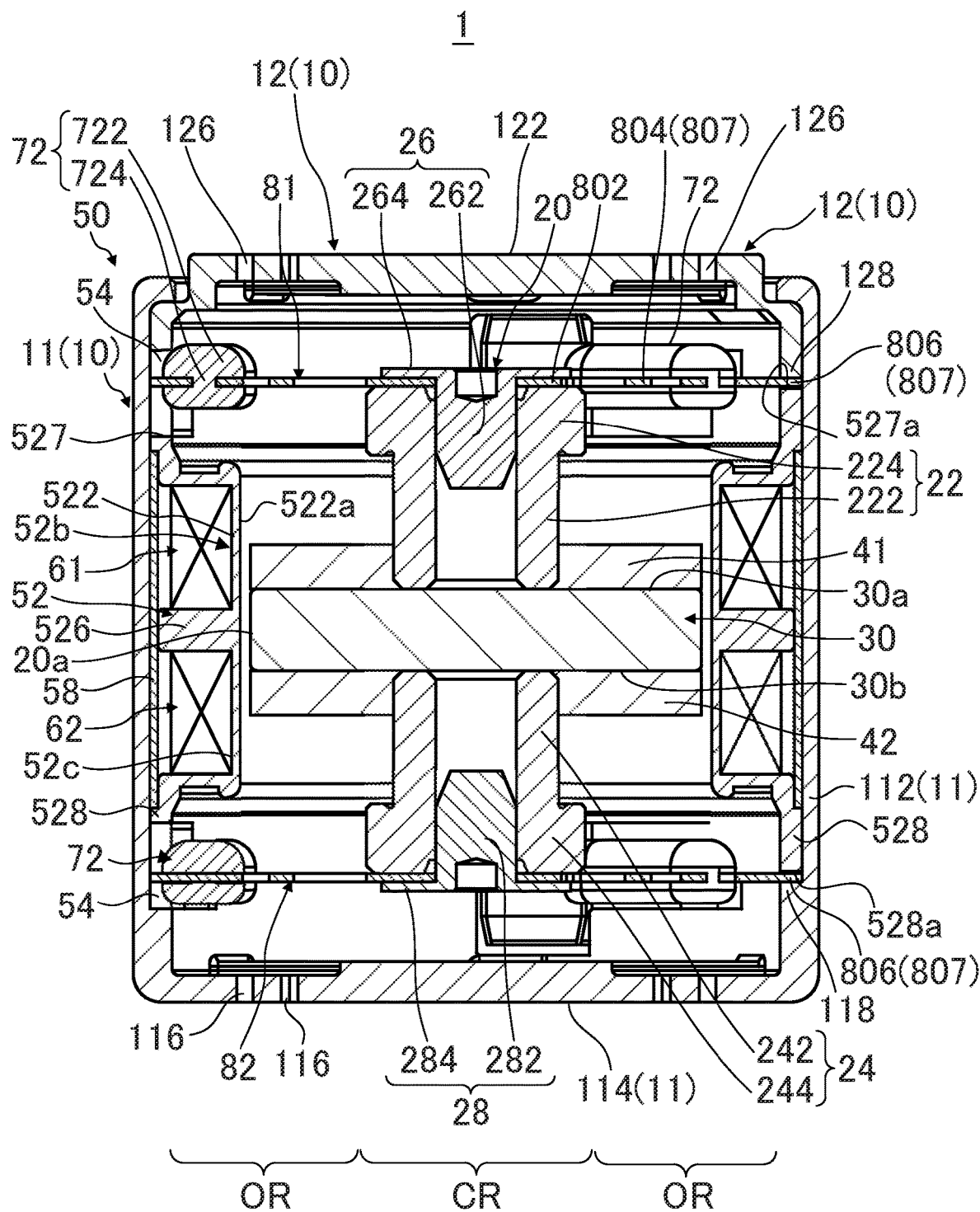
FIG. 2 is a longitudinal sectional view of the vibration actuator.
Figure 3:
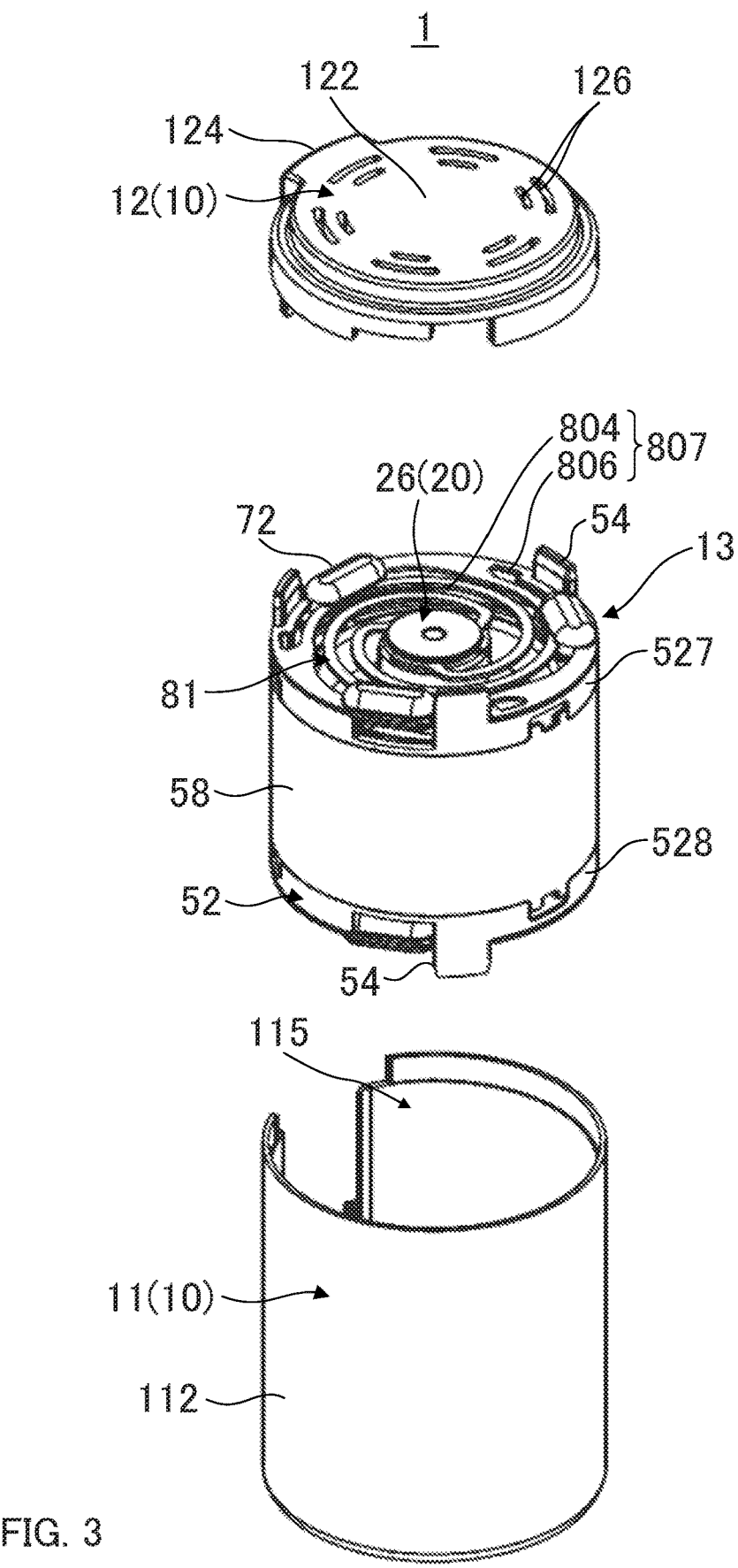
FIG. 3 is a perspective view of the vibration actuator from which a case is detached.
Figure 4:
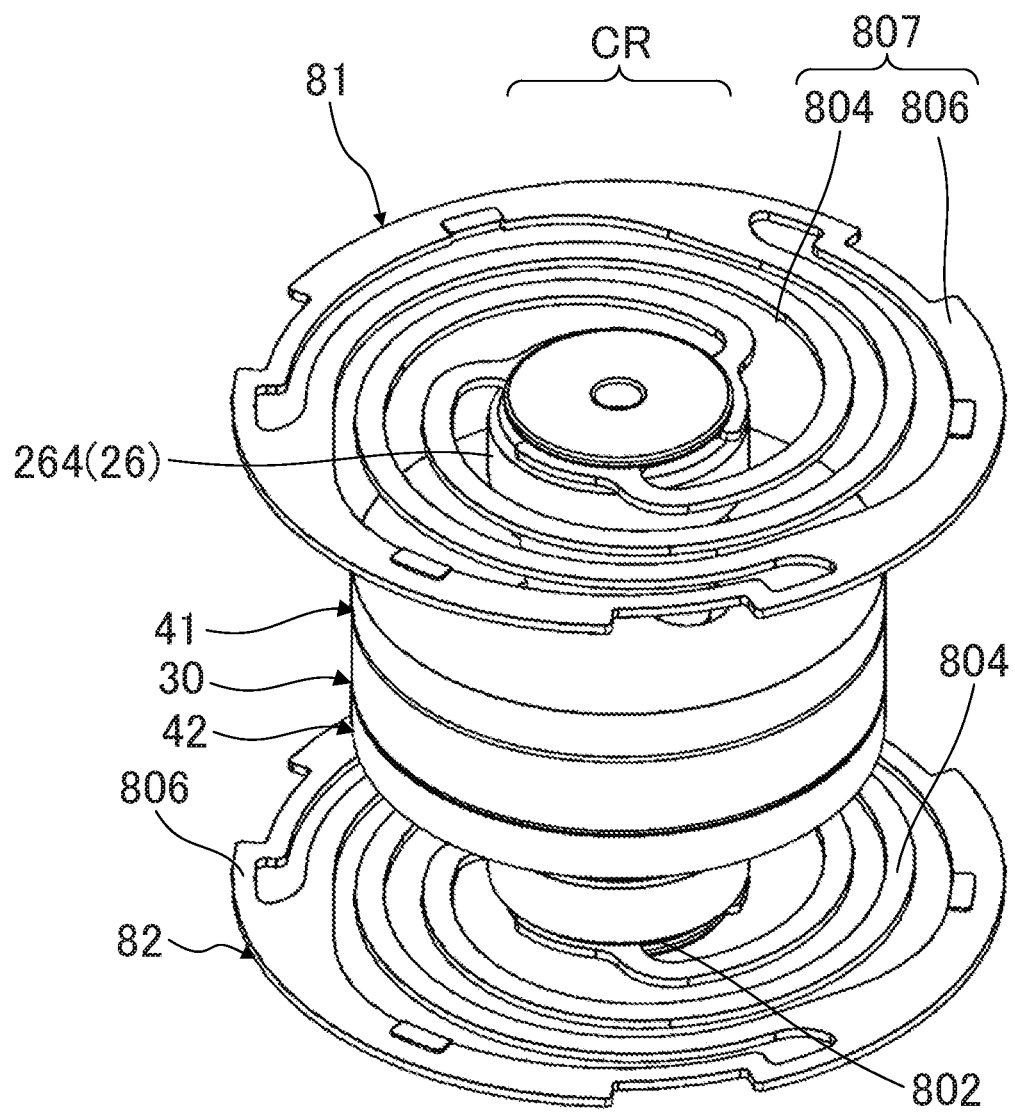
FIG. 4 is a perspective view of a movable body to which elastic supporting parts are fixed.
Figure 5:
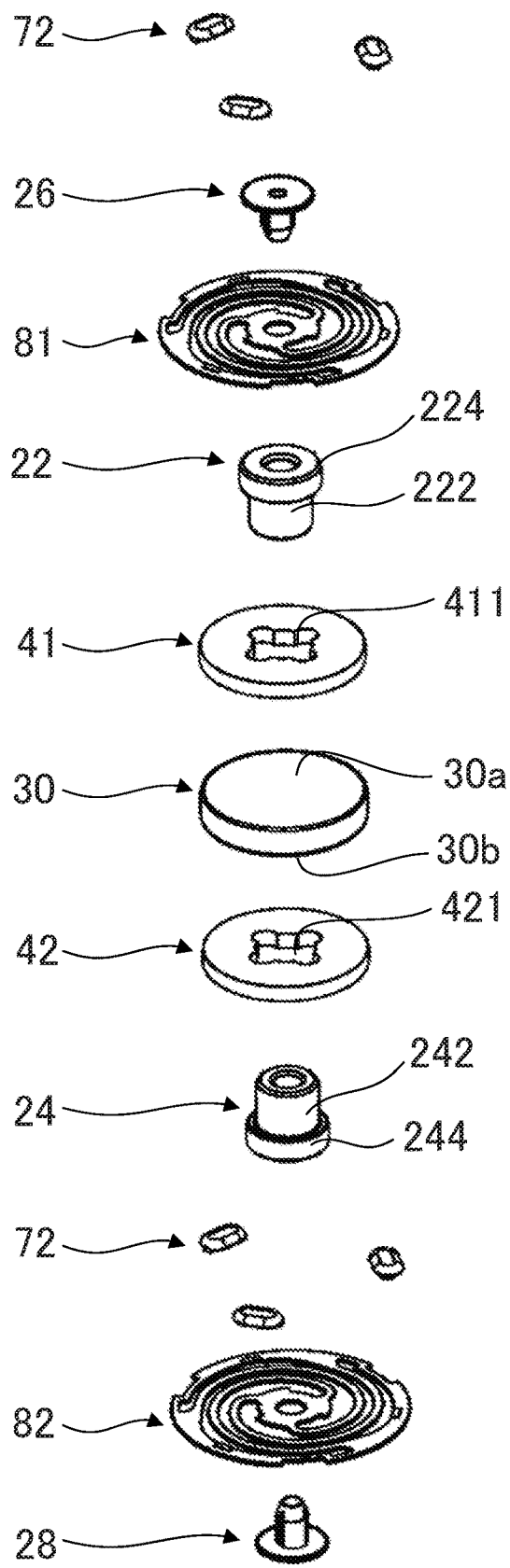
FIG. 5 is an exploded perspective view of the movable body and the elastic supporting parts.
Figure 6:
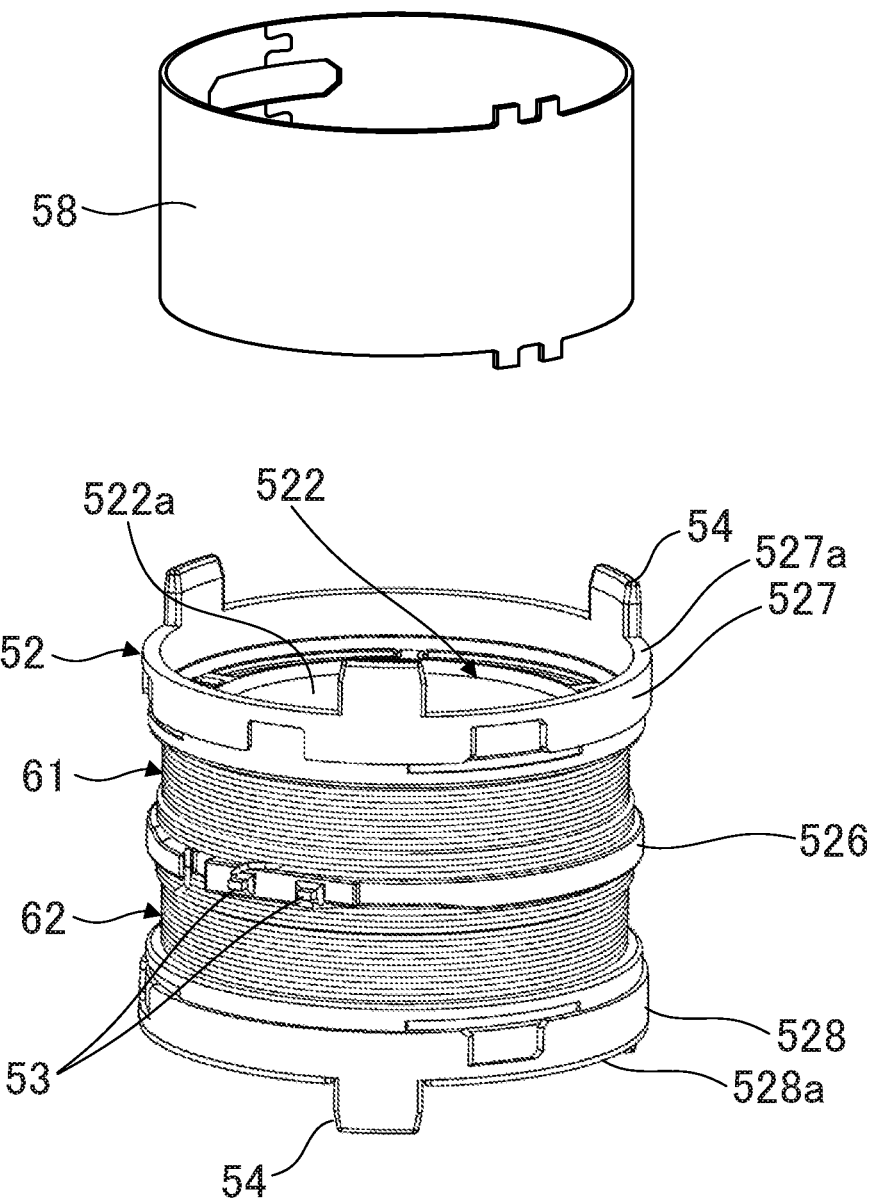
FIG. 6 illustrates a coil assembly with an electromagnetic shield part detached.
Figure 7:
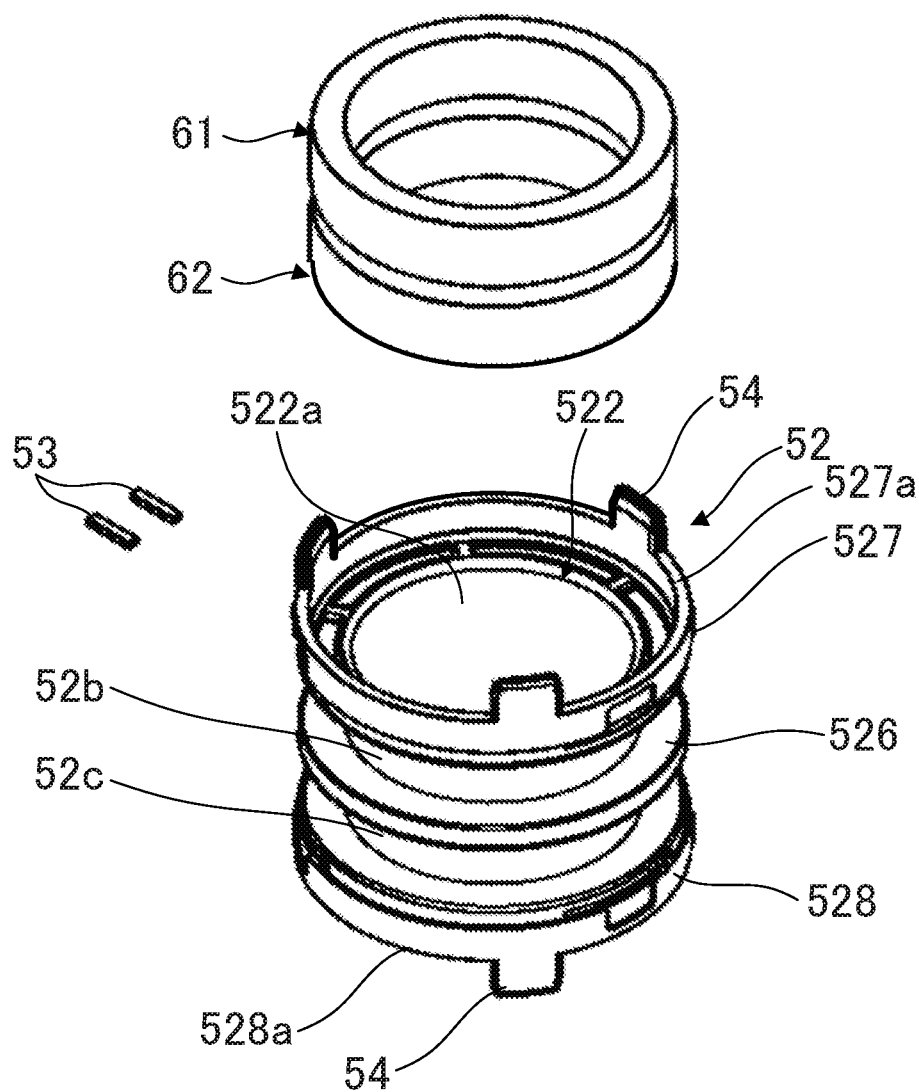
FIG. 7 is an exploded view of the coil assembly.

FIG. 1 is an external perspective view of a vibration actuator according to an embodiment of the present invention, FIG. 2 is a longitudinal sectional view of the vibration actuator, and FIG. 3 is a perspective view of the vibration actuator from which the case is detached. FIG. 4 is a perspective view of a movable body to which elastic supporting parts are fixed, and FIG. 5 is an exploded perspective view of the movable body and the elastic supporting parts. Further, FIG. 6 illustrates a coil assembly with an electromagnetic shield part detached, and FIG. 7 is an exploded view of the coil assembly. Note that the "upper" side and the "lower" side in the present embodiment are given for convenience of understanding, and mean one side and the other side in the vibration actuator of the movable body in the vibration direction. That is, when the vibration actuator is mounted on an electronic device (see FIGS. 16 and 17), the upper and lower sides may be reversed, or may also be left and right.

Vibration actuator 1 according to Embodiment 1 is mounted as a vibration source on an electronic device such as a portable game terminal device (for example, game controller GC illustrated in FIG. 16) to implement a vibration function of the electronic device. Examples of this electronic device include a portable device such as a smart phone (for example, mobile terminal M illustrated in FIG. 17). Vibration actuator 1 is mounted on a device such as a portable game terminal device or a portable device, and is driven to vibrate to notify a user of an incoming call or to give an operational feel or realism.

As illustrated in FIGS. 1 and 2, vibration actuator 1 of the present embodiment houses, in hollow case 10, movable body 20 such that movable body 20 is capable of vibrating in the axial direction (upper-lower direction) of case 10, which is the vibration direction, between upper and lower end surfaces. Movable body 20 movable inside case 10 allows vibration actuator 1 itself to function as a vibration body.

Vibration actuator 1 includes: movable body 20 including magnet 30 and movable-body cores 41 and 42; fixing body 50 including coils 61 and 62; and plate-like elastic supporting parts 81 and 82 for supporting movable body 20 such that the movable body freely reciprocates with respect to fixing body 50.

Coils 61 and 62, magnet 30, and movable-body cores 41 and 42 in vibration actuator 1 constitute a magnetic circuit for vibrating movable body 20. In vibration actuator 1, when coils 61 and 62 are energized from a power supplying section (e.g., drive control section 203 illustrated in FIGS. 16 and 17), coils 61 and 62 and magnet 30 cooperate to cause movable body 20 to reciprocate in the vibration direction within case 10.

In vibration actuator 1 of the present embodiment, bobbin main-body portion (coil protection wall portion) 522 disposed between movable body 20 and coils 61 and 62 allows movable body 20 to reciprocate in the axial direction of coils 61 and 62 (i.e., the vibration direction) inside coils 61 and 62 held by coil bobbin part (coil holding part) 52. The axial direction of coils 61 and 62 is the vibration direction of movable body 20, is also the magnetization direction of magnet 30, and is also the axial direction of coil bobbin part 52.

Movable body 20 is disposed via elastic supporting parts 81 and 82 such that, in a non-vibration state in which movable body 20 is not moving, the center of the length of movable body 20 in the vibration direction and the center of the length of coil bobbin part 52 in the vibration direction face each other in a direction orthogonal to the axial direction of movable body 20 with a predetermined gap being interposed between the movable body and the coil bobbin part. At this time, it is desirable that movable body 20 be located at a position where movable body 20 is balanced between coils 61 and 62 without making contact with bobbin main-body portion 522 of coil bobbin part 52. In the present embodiment, it is preferable that the center of the length along magnet 30 and movable-body cores 41 and 42 in the vibration direction be disposed to face, in the direction orthogonal to the vibration direction, the center of the length of a space between vertically spaced coils 61 and 62 in the vibration direction. Note that, a magnetic fluid may be interposed between bobbin main-body portion 522 and movable body 20.

In the present embodiment, vibration actuator 1 is configured such that drive unit 13 including coils 61 and 62, coil bobbin part 52, movable body 20, and elastic supporting parts 81 and 82 is disposed in case 10 including case main body 11 and lid portion 12 as illustrated in FIG. 3.

<Movable Body 20>

Movable body 20 is supported inside cylindrical coil bobbin part 52 of fixing body 50 by elastic supporting parts 81 and 82 connected at the upper and lower end portions of the movable body, so as to be capable of reciprocating along inner circumferential surface 522a of bobbin main-body portion 522. In other words, in vibration actuator 1, movable body 20 is supported to be capable of reciprocating in a direction in which lid portion 12 and bottom portion 114 face each other. Movable body 20 is disposed in drive unit 13 illustrated in FIG. 3.

Movable body 20 includes magnet 30, movable-body cores 41 and 42, spring retaining parts 22 and 24, and fixation pins 26 and 28 as illustrated in FIGS. 2, 4 and 5. In the present embodiment, movable-body cores 41 and 42 and spring retaining parts 22 and 24 are continuously disposed respectively toward opposite sides from magnet 30 in the vibration direction (in the upper-lower direction in the figures). In movable body 20, outer circumferential surface 20a of magnet 30 and movable-body cores 41 and 42 is disposed inside inner circumferential surface 522a of bobbin main-body portion 522 to face inner circumferential surface 522a with a predetermined gap being interposed between the outer circumferential surface of the magnet and the movable-body cores and the inner circumferential surface of the bobbin main-body portion.

When movable body 20 moves in the vibration direction, movable body 20 reciprocates along inner circumferential surface 522a such that outer circumferential surface 20a does not make contact with inner circumferential surface 522a.

Magnet 30 is magnetized in the vibration direction. Magnet 30 is formed in a disk shape in the present embodiment, and front and back surfaces 30a and 30b distant from each other in the vibration direction respectively have different poles. Front and back surfaces 30a and 30b of magnet 30 are two magnetized surfaces distant from each other in the extending direction of the axes of coils 61 and 62.

Magnet 30 is disposed radially inside coils 61 and 62 (described in detail below) with a gap being interposed between the magnet and the coils. Here, the term "radially (radial direction)" means a direction orthogonal to the axes of coils 61 and 62, and also means the direction orthogonal to the vibration direction. This "gap" in the radial direction is a gap between magnet 30 and coils 61 and 62 including bobbin main-body portion 522, and is a gap allowing movable body 20 to move in the vibration direction of movable body 20 such that magnet 30 and coils 61 and 62 do not make contact with each other. That is, the "gap" means a predetermined gap between bobbin main-body portion 522 and magnet 30 in the present embodiment.

Magnet 30 is disposed to face, at the outside in the radial direction, the center of bobbin main-body portion 522 in the present embodiment. Note that, magnet 30 may have any other shape than the disk shape, such as a cylindrical shape, a plate-like shape, or the like as long as magnet 30 is disposed inside coils 61 and 62 such that the two magnetized surfaces face in the extending direction of the axes of coils 61 and 62. Further, it is desirable that the center of magnet 30 in the axial direction coincide with the center of movable body 20 in the axial direction.

Movable-body cores 41 and 42 are disposed respectively on front and back surfaces 30a and 30b of magnet 30.

Movable-body cores 41 and 42 are magnetic materials, function as a yoke, and constitute the magnetic circuit together with magnet 30 and coils 61 and 62. Movable-body cores 41 and 42 concentrate magnetic flux of magnet 30 to cause the magnetic flux to efficiently flow without leaking, so as to effectively distribute the magnetic flux flowing between magnet 30 and coils 61 and 62.

In addition to the function as a part of the magnetic circuit, movable-body cores 41 and 42 in movable body 20 have a function as a main-body part of movable body 20, a function of fixing spring retaining parts 22 and 24, and a function as a weight.

In the present embodiment, movable-body cores 41 and 42 are formed in an annular flat plate shape having the same surface shape as magnet 30. Movable-body cores 41 and 42 are fixed to magnet 30 such that the outer circumferential surfaces of movable-body cores 41 and 42 are flush with the outer circumferential surface of the magnet, and forms outer circumferential surface 20a of movable body 20 together with the outer circumferential surface of the magnet.

Movable-body cores 41 and 42 are the same similarly-formed members in the present embodiment, and are symmetrically disposed above and below magnet 30 so as to sandwich magnet 30. Note that, movable-body cores 41 and 42 are attracted to magnet 30, and also are fixed to magnet 30, for example, by a thermosetting adhesive such as an epoxy resin or an anaerobic adhesive.

Fitting openings 411 and 421 are formed in the respective central portions of movable-body cores 41 and 42. Upper and lower spring retaining parts 22 and 24 are disposed in fitting openings 411 and 421 such that their respective axes (corresponding to the central axes of elastic supporting parts 81 and 82) are located on the central axis of movable body 20. Fitting openings 411 and 421 make contact with inserted spring retaining parts 22 and 24 at three or four points for fixing them accurately on their axes, so as to support upper and lower spring retaining parts 22 and 24 such that spring retaining parts 22 and 24 are located on the axis of movable body 20. In fitting openings 411 and 421, the degrees of openings in movable-body cores 41 and 42 are adjustable for adjusting the weight of movable body 20, so that a suitable vibration output can be set.

In the present embodiment, movable-body cores 41 and 42 are located inside (radially inside) coils 61 and 62 to respectively face coils 61 and 62 in the direction orthogonal to the axial direction of coils 61 and 62 in the non-vibration state of movable body 20.

Movable-body cores 41 and 42, together with magnet 30, constitute a movable-body-side magnetic circuit. In the present embodiment, it is preferable that the height position of the upper surface of movable-body core 41 on the upper side of magnet 30 face the position of the center of upper coil 61 in the height direction (upper-lower direction). In addition, it is preferable that the height position of the lower surface of movable-body core 42 on the lower side of magnet 30 face the position of the center of lower coil 62 in the height direction (upper-lower direction).

Spring retaining parts 22 and 24 have a function of fixing the movable-body-side magnetic circuit to elastic supporting parts 81 and 82, and a function as a weight of movable body 20. Spring retaining parts 22 and 24 are symmetrically disposed to sandwich magnet 30 and movable-body cores 41 and 42, and increase the vibration output of movable body 20.

Spring retaining parts 22 and 24 are a shaft-like body disposed along the central axis of movable body 20 in the present embodiment, and are interposed between movable-body cores 41 and 42 and elastic supporting parts 81 and 82.

Spring retaining parts 22 and 24 are formed in the same shape in the present embodiment, and have joint portions 222 and 242 and spring fixation portions 224 and 244. These joint portions 222 and 242 and spring fixation portions 224 and 244 are continuously formed in the vibration direction (specifically, in the upper-lower direction).

Each of spring retaining parts 22 and 24 has a through hole extending through the spring retaining part. Note that, spring retaining parts 22 and 24 may function as a weight adjusting part that adjusts the weight by addition of a weight in the through hole. It is possible to increase the vibration output of movable body 20 by making movable body 20 heavier by adding a weight in the through hole.

Joint portions 222 and 242 are joined to movable-body cores 41 and 42, respectively. Specifically, joint portions 222 and 242 are, at one end side, inserted in and fitted internally to fitting openings 411 and 421 of movable-body cores 41 and 42, respectively. Spring retaining parts 22 and 24 are fixed to movable-body cores 41 and 42 by press-fitting in the present embodiment, but the present invention is not limited thereto, and spring retaining parts 22 and 24 may also be fixed, for example, by adhesion using a thermosetting adhesive such as epoxy resin or an anaerobic adhesive.

Upper spring fixation portion 224 forms one end portion of movable body 20 in the vibration direction, that is, the upper end portion of movable body 20, and is joined to inner circumferential portion 802, which is an inner-diameter-side end portion of an upper leaf spring serving as elastic supporting part 81. Meanwhile, lower spring fixation portion 244 forms the other end portion of movable body 20 in the vibration direction, that is, the lower end portion of movable body 20, and is joined to inner circumferential portion 802, which is an inner-diameter-side end portion of a lower leaf spring serving as elastic supporting part 82.

Spring fixation portions 224 and 244 are disposed to protrude upward and downward from joint portions 222 and 242, respectively, and are, at their tips, joined to inner circumferential portions 802 and 802 of elastic supporting parts 81 and 82 via fixation pins 26 and 28, respectively.

Fixation pins 26 and 28 firmly fix together elastic supporting parts 81 and 82 and movable body 20 such that they do not come off each other by the vibration of movable body 20.

Fixation pins 26 and 28 are formed in the same shape in the present embodiment, and respectively have shaft-shaped pin main bodies 262 and 282 that can be press-fitted into spring fixation portions 224 and 244, and flanges 264 and 284 formed on the edges of pin main bodies 262 and 282 on one end side.

Specifically, respective pin main bodies 262 and 282 of fixation pins 26 and 28 are fixed by press-fitting via the openings of inner circumferential portions 802 into the through holes of spring fixation portions 224 and 244 in a state where respective inner circumferential portions 802 of elastic supporting parts 81 and 82 are stacked on spring fixation portions 224 and 244. Thus, flanges 264 and 284, together with spring fixation portions 224 and 244, clamp and firmly join inner circumferential portions 802 of elastic supporting parts 81 and 82. Note that, inner circumferential portions 802 of elastic supporting parts 81 and 82 and spring fixation portions 224 and 244 may be joined by welding, bonding, caulking, or the like, or by a combination of welding, bonding, or caulking.

Since in movable body 20, spring retaining parts 22 and 24 are disposed at opposite end portions (upper and lower end portions) distant from each other with respect to the movable-body-side magnetic circuit in the vibration direction, the weight in movable body 20 is not disposed on the outer circumferential side of the movable body magnetic circuit. Thus, the arrangement space for coils 61 and 62 located to face each other on the outer circumferential side of the movable-body-side magnetic circuit (i.e., on the outer circumferential side of movable body 20) is not limited. Accordingly, the distance between the movable-body magnetic circuit and coils 61 and 62 does not increase, so that the efficiency in electromagnetic conversion is not reduced. Accordingly, it is possible to preferably increase the weight of movable body 20, so as to achieve a higher vibration output.

In addition, since spring retaining parts 22 and 24 have the function as a weight and the function of spring fixation, it is not necessary to assemble individual members respectively having these functions. Only by disposing spring retaining parts 22 and 24 in the movable-body-side magnetic circuit, the weight and the upper and lower leaf springs being elastic supporting parts 81 and 82 can be easily attached to movable body 20, so that the assemblability is enhanced.

Note that, while spring retaining parts 22 and 24 may be formed from a magnetic material, it is desirable that spring retaining parts 22 and 24 be formed from a non-magnetic material. When spring retaining parts 22 and 24 are formed from a non-magnetic material, no magnetic flux from movable-body core 41 flows upward and no magnetic flux from movable-body core 42 flows downward, so that it is possible to cause the magnetic flux to flow toward coils 61 and 62 located on the outer circumferential side of movable-body cores 41 and 42 efficiently.

Further, it is preferable that spring retaining parts 22 and 24 be formed from a material having a higher specific gravity (e.g., the specific gravity as high as about 16 to 19) than a material of a silicon steel plate or the like (the specific gravity of the steel plate is 7.70 to 7.98). For example, tungsten can be applied as the material of spring retaining parts 22 and 24. Thus, even when the outer dimensions of movable body 20 are set in a design or the like, it is possible to relatively easily increase the mass of movable body 20, so as to achieve a desired vibration output producing a sufficient tactile vibration for the user.

<Fixing Body 50>

Fixing body 50 holds coils 61 and 62, and supports, via elastic supporting parts 81 and 82, movable body 20 inside coils 61 and 62 in the radial direction such that movable body 20 is freely movable in the vibration direction (the coil-axis direction, the axial direction of movable body 20).

Fixing body 50 includes case 10, coils 61 and 62, coil bobbin part 52, and electromagnetic shield part 58.

Coil bobbin part 52 holds coils 61 and 62 wound on the outer circumferential surface the coil bobbin part, surrounds magnet 30 by inner circumferential surface 522*a*, and guides the movement of movable body 20 including magnet 30.

Coil bobbin part 52 is a cylindrical body formed from a resin such as a phenolic resin, poly butylene terephthalate (PBT), or the like. In the present embodiment, coil bobbin part 52 is formed from a material containing a phenolic resin such as Bakelite having high flame retardancy.

When coil bobbin part 52 is formed from a material containing a phenolic resin, a higher flame retardancy is obtained, so that it is possible to improve the safety at the time of driving even when heat is generated by Joule heat when a current flows through coils 61 and 62 held by coil bobbin part 52. Moreover, the dimensional accuracy is increased and the positional accuracy of coils 61 and 62 is increased accordingly, so that it is possible to reduce variations in vibration characteristics.

Coil bobbin part 52 includes cylindrical bobbin main-body portion 522, flange portions 526 to 528 protruding from the outer circumference of bobbin main-body portion 522 in the radial direction, terminal tying parts (coil connection parts) 53, and movable-range forming parts 54.

Inner circumferential surface 522*a* of bobbin main-body portion 522 is disposed to face the outer circumferential surface of movable body 20 with a predetermined gap being interposed between the inner circumferential surface of the bobbin main-body portion and the outer circumferential surface of the movable body. This predetermined gap is a gap allowing movable body 20 to move in the axial direction, which is the vibration direction, without making contact with inner circumferential surface 522*a* when movable body 20 moves in the vibration direction. Bobbin main-body portion 522 is configured to inhibit contact between magnet 30 and coils 61 and 62. Movable body 20 is capable of reciprocating along inner circumferential surface 522*a* without making contact with inner circumferential surface 522*a*.

Bobbin main-body portion 522 functions as a protective wall portion for protecting coils 61 and 62 against collision by movable body 20 when movable body 20 disposed inside is being driven. The thickness of bobbin main-body portion 522 is a thickness that gives such a strength that coils 61 and 62 on the outer circumferential side are not affected at all even when moving movable body 20 makes contact with bobbin main-body portion 522.

Coils 61 and 62 are disposed on the outer circumferential side of bobbin main-body portion 522 in such a manner as to be lie side-by-side in the coil-axis direction and to surround the outer circumferential surfaces of movable-body cores 41 and 42 of movable body 20 (the outer circumferential surface of magnet 30 and movable-body cores 41 and 42).

Specifically, flange portions 526 to 528 and recessed coil attachment portions 52*b* and 52*c* that open radially outward on the outer circumferential side are disposed on and in the outer circumferential surface of bobbin main-body portion 522.

Terminal tying parts 53 function as a connector connection portion to which the coil winding of coils 61 and 62 is tied for connection to an external device as illustrated in FIGS. 6 and 7. Coils 61 and 62 are connected to the external device via terminal tying parts 53 and power is supplied to coils 61 and 62.

Terminal tying parts 53 are electrically conductive members disposed to protrude from the outer circumferential portion of bobbin main-body portion 522. In the present embodiment, terminal tying parts 53 are press-fitted to the outer circumferential surface of central flange portion 526 disposed on the outer circumferential of bobbin main-body portion 522 centrally in the vibration direction. Terminal tying parts 53 are thus disposed to protrude from the outer circumferential surface of flange portion 526.

Flange portions 527 and 528 are disposed respectively on opposite end portions of bobbin main-body portion 522 which are distant from each other in the axial direction of the bobbin main-body portion (which is also the vibration direction and the upper-lower direction in the present embodiment), so as to form the upper and lower end portions of coil bobbin part 52.

Elastic supporting parts 81 and 82 are fixed to end portions of flange portions 527 and 528 on the sides away from flange portion 526 (upper and lower end portions in the present embodiment).

Movable-range forming parts 54 are disposed on the upper and lower end portions of coil bobbin part 52, and form a vibration range between lid portion 12 and bottom portion 114 of case 10 and movable body 20 when coil bobbin part 52 is housed in case 10.

Movable-range forming parts 54 are protruding side portions that are formed to protrude from each of flange portions 527 and 528 in the vibration direction (upper-lower direction), and are disposed at predetermined intervals on upper and lower annular end surfaces 527*a* and 528*a* of flange portions 527 and 528.

Coil bobbin part 52 is housed in case 10 such that movable-range forming parts 54 at the upper and lower end portions are in contact with the edge of lid portion 12 and the edge of bottom portion 114, and is fixed to the edge of bottom portion 114.

<Coil>

In vibration actuator 1, coils 61 and 62, together with magnet 30 and movable-body cores 41 and 42, are used for generating a drive source of vibration actuator 1, in which case the axial direction of coils 61 and 62 (magnetization direction of magnet 30) is the vibration direction. Coils 61 and 62 are energized during driving (vibration state), and, together with magnet 30, form a voice coil motor.

Coils 61 and 62 are disposed on coil attachment portions 52*b* and 52*c*, and coils 61 and 62 are disposed to face movable-body cores 41 and 42 in the direction orthogonal to the vibration direction.

Coils 61 and 62 are held by coil bobbin part 52 such that the center position of the length of the coils and the coil bobbin part in the coil-axis direction (vibration direction) is substantially the same position (including the same position) in the vibration direction as the center position of the length of movable body 20 in the vibration direction (the center position of magnet 30 in the vibration direction). Note that, coils 61 and 62 of the present embodiment are configured to be wound in directions opposite to each other, through which currents flow in the opposite directions during energization.

The end portions of coils 61 and 62 are tied and connected to terminal tying parts 53 of flange portion 526.

Figure 16:
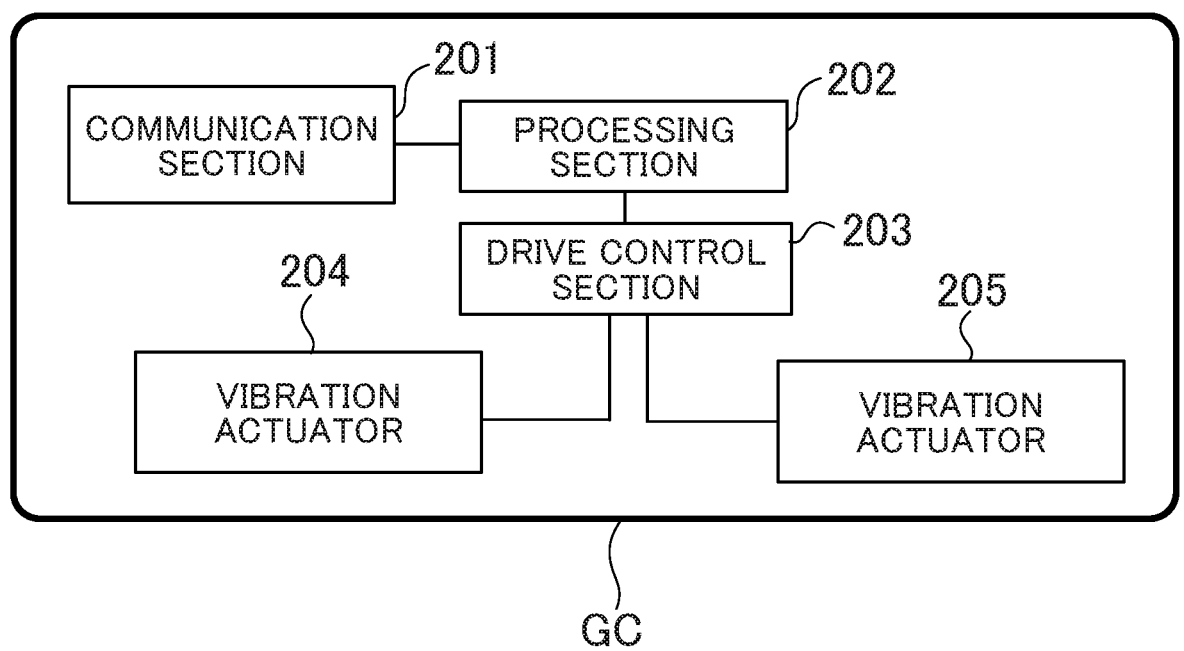
FIG. 16 illustrates an example of an electronic device on which the vibration actuator is mounted.
Figure 17:
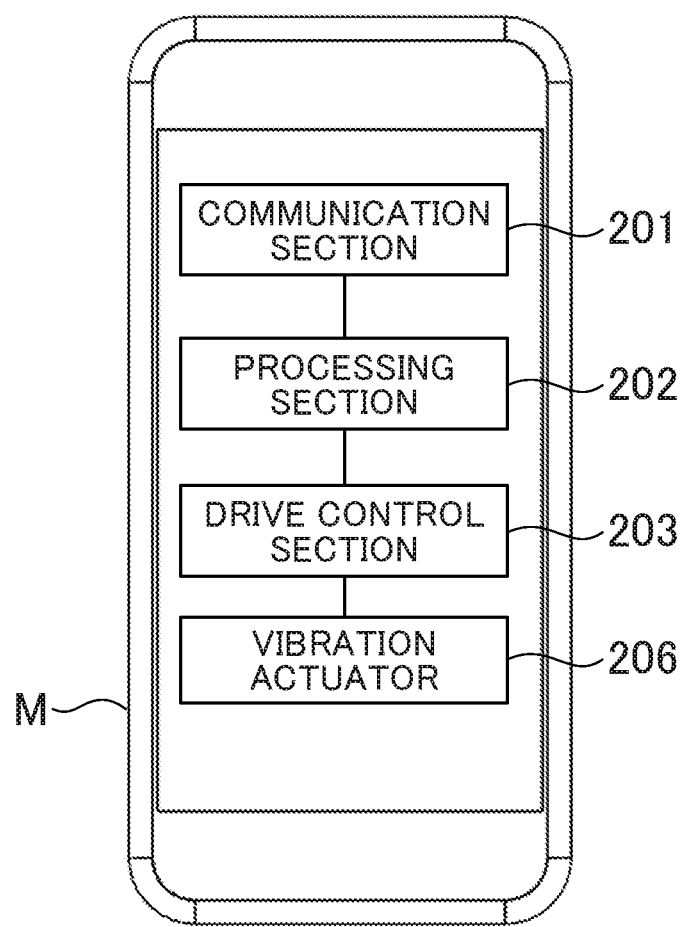
FIG. 17 illustrates an example of an electronic device on which the vibration actuator is mounted.

Coils 61 and 62 are connected via terminal tying parts 53 to the power supplying section (e.g., drive control section 203 illustrated in FIGS. 16 and 17). For example, the end portions of coils 61 and 62 are connected to an alternating-current supplying section, and coils 61 and 62 are supplied with alternating-power (AC) power (AC voltage) from the alternating-current supplying section. Thus, coils 61 and 62 can generate, between the magnet and coils 61 and 62, thrust allowing movement in a direction toward each other or away from each other in their axial direction.

It is preferable that the coil axes of coils 61 and 62 be disposed coaxially with the axis of coil bobbin part 52 or the axis of magnet 30. Coils 61 and 62 are formed in a cylindrical shape by winding a coil winding on coil attachment portions 52b and 52c from the outside of coil bobbin part 52. With this configuration, coil bobbin part 52 including coils 61 and 62 maintains the cylindrical bodies of coils 61 and 62, and can thus be assembled without using a self-bonding wire for the coils. In other words, since it is not necessary to use an air-core coil as the coils, it is possible to reduce the cost of coils 61 and 62 itself and, thus, the cost of the vibration actuator itself.

Further, coils 61 and 62 are, at the outer circumferential surface, surrounded by electromagnetic shield part 58 inside case 10, sealed by coil attachment portion 52b and 52c, and fixed by adhesion or the like within coil attachment portions 52b and 52c. In the present embodiment, coils 61 and 62 are fixed by adhesion to all of bobbin main-body portion 522 and flange portions 526 to 528 that constitute coil attachment portions 52b and 52c. It is thus possible to increase the bonding strength between coils 61 and 62 and coil bobbin part 52, so that even when a large impact is applied to coils 61 and 62, coils 61 and 62 are less damaged than in a configuration in which a movable body makes direct contact with a coil.

Electromagnetic shield part 58 is a cylindrical magnetic material that surrounds the outer circumferential surface of coil bobbin part 52 and is disposed to cover coils 61 and 62 radially externally. Electromagnetic shield part 58, together with coils 61 and 62, constitutes a fixing-body-side magnetic circuit, and prevents, in the movable-body-side magnetic circuit, i.e., the magnetic circuit constituted by magnet 30 and movable-body cores 41 and 42, leakage magnetic flux to the outside of vibration actuator 1.

Electromagnetic shield part 58 is disposed such that the center of the length of electromagnetic shield part 58 in the vibration direction is located at the same height as the center in the vibration direction of magnet 30 disposed inside electromagnetic shield part 58. The shielding effect of electromagnetic shield part 58 makes it possible to reduce the leakage magnetic flux to the outside of the vibration actuator.

Electromagnetic shield part 58 also makes it possible to increase the thrust constant so as to increase the electromagnetic conversion efficiency in the magnetic circuit.

Electromagnetic shield part 58 utilizes the magnetic attraction force of magnet 30 to function as a magnetic spring together with magnet 30. Any stress in elastic supporting parts 81 and 82 that would be caused if elastic supporting parts 81 and 82 are mechanical springs can be reduced, so that the durability of elastic supporting parts 81 and 82 can be increased.

<Elastic Supporting Parts 81 and 82>

Elastic supporting parts 81 and 82 support movable body 20 such that the movable body freely reciprocates in the vibration direction with respect to fixing body 50.

Elastic supporting parts 81 and 82 sandwich movable body 20 in the vibration direction of movable body 20 and are installed between both movable body 20 and fixing body 50 to intersect the vibration direction. In the present embodiment, elastic supporting parts 81 and 82 are disposed respectively on the opposite ends (upper and lower ends) of movable body 20 which are distant from each other in the vibration direction, so as to be distant from each other, and are connected to fixing body 50 as illustrated in FIGS. 2 to 4. In the present embodiment, elastic supporting parts 81 and 82 are disposed to extend in the direction orthogonal to the vibration direction and to face each other.

In elastic supporting parts 81 and 82, their inner circumferential portions 802 are fitted respectively to the opposite end portions (spring fixation portions 224 and 244) of movable body 20 spaced apart from each other in the axial direction (vibration direction) of the movable body. Elastic supporting parts 81 and 82 are attached to movable body 20 such that outer circumferential fixing portions 806 project radially outward (in the radial direction).

Elastic supporting parts 81 and 82 support movable body 20 such that movable body 20 does not make contact with fixing body 50 in the non-vibration state and the vibration state of movable body 20. Note that, elastic supporting parts 81 and 82 do not allow the magnetic circuit (specifically, coils 61 and 62) to be damaged even when movable body 20 makes contact with inner circumferential surface 522a of bobbin main-body portion 522 in the driven (vibration) state of movable body 20. Elastic supporting parts 81 and 82 may also be formed from any material as long as they elastically support movable body 20 such that the movable body is freely movable. Elastic supporting parts 81 and 82 are the same members having the same configuration in the present embodiment.

Elastic supporting parts 81 and 82 are a plurality of flat plate-like leaf springs. For movable body 20, the plurality of elastic supporting parts 81 and 82 may be three or more leaf springs. The plurality of leaf springs are attached to extend along the direction orthogonal to the vibration direction.

Each of elastic supporting parts 81 and 82 that are leaf springs has such a shape that annular inner circumferential portion 802, which is a spring end portion situated on the inner side, and outer circumferential fixing portion 806, which is a spring end portion situated on the outer side, are joined to each other via deformation arms 804 that are elastically deformed and have the shape of circular arcs in plan view. Deformation arms 804 and outer circumferential fixing portion 806 constitute outer circumferential portion 807 of each of elastic supporting parts 81 and 82. In each of elastic supporting parts 81 and 82, deformation of deformation arm 804 causes inner circumferential portion 802 to be displaced with respect to outer circumferential fixing portion 806 in the axial direction.

In elastic supporting parts 81 and 82, outer circumferential fixing portion 806 is joined to fixing body 50, and inner circumferential portion 802 is joined to movable body 20.

The leaf springs as elastic supporting parts 81 and 82 are formed by sheet metal processing using a stainless steel plate, and more specifically, are formed into thin flat disk-shaped whirl-shaped springs in the present embodiment. Since elastic supporting parts 81 and 82 are flat plate-like, it is possible to improve the positional accuracy, that is, to improve the processing accuracy as compared with a conical spring.

In the plurality of elastic supporting parts 81 and 82, outer circumferential fixing portion 806 being one end of each of elastic supporting parts 81 and 82 on the outer circumferential side is fixed to fixing body 50 and inner circumferential portion 802 being the other end of each of elastic supporting parts 81 and 82 on the inner circumferential side is fixed to movable body 20 in the present embodiment such that the directions of the whirls of elastic supporting parts 81 and 82 are the same.

As described above, a plurality of whirl-shaped leaf springs are used as the plurality of elastic supporting parts 81 and 82 in the present embodiment. Elastic supporting parts 81 and 82 are attached respectively to the opposite end portions of movable body 20 which are distant from each other in the vibration direction, and elastically support movable body 20 with respect to fixing body 50. Thus, when the movement amount of movable body 20 increases, the movable body slightly moves in a translational direction (here, the direction on a plane perpendicular to the vibration direction) while rotating. If the whirl directions of the plurality of leaf springs are opposite, the plurality of leaf springs move in a buckling direction or a pulling direction to each other, thereby preventing smooth movement.

Elastic supporting parts 81 and 82 of the present embodiment are fixed to movable body 20 such that the whirl directions are the same. Thus, even when the movement amount of movable body 20 increases, elastic supporting parts 81 and 82 can move smoothly, i.e., can be deformed to produce a greater amplitude, so that the vibration output can be increased.

However, depending on a desired vibration range of movable body 20, the whirl directions of the plurality of elastic supporting parts 81 and 82 may be designed to be opposite directions to each other.

Plate-like elastic supporting parts 81 and 82 are disposed on movable body 20 such that inner circumferential portions 802 of elastic supporting parts 81 and 82 are stacked respectively on spring fixation portions 224 and 244 forming the end portions of movable body 20 in the vibration direction. Inner circumferential portions 802 of elastic supporting parts 81 and 82 are fixedly sandwiched between flanges 264 and 284 of fixation pins 26 and 28 and spring fixation portions 224 and 244 as described above.

Meanwhile, outer circumferential fixing portion 806 of upper elastic supporting part 81 is, at the outside in the radial direction, fixed to the upper end portion of coil bobbin part 52. Specifically, outer circumference fixing portion 806 of elastic supporting part 81 is fixed to a portion of annular upper end surface 527a of upper flange portion 527 forming the upper end portion of coil bobbin part 52, the portion being other than movable-range forming parts 54.

Outer circumferential fixing portion 806 of elastic supporting part 81 is clamped and fixed by annular upper end surface 527a of flange portion 527 and pressing portion 128 of lid portion 12 within case 10. Note that, pressing portion 128 is disposed to protrude from the outer edge portion of the back surface of top surface portion 122 of lid portion 12, and is formed in an arc shape in bottom view.

Further, outer circumferential fixing portion 806 of lower elastic supporting part 82 is, at the outside in the radial direction, fixed to the lower end portion of coil bobbin part 52. Specifically, outer circumference fixing portion 806 of elastic supporting part 82 is fixed to a portion of annular lower end surface 528a of lower flange portion 528 forming the lower end portion of coil bobbin part 52, the portion being other than movable-range forming parts 54.

Outer circumferential fixing portion 806 of elastic supporting part 82 is clamped and fixed by annular lower end surface 528a of flange portion 528 and step portion 118 formed on a circumferential edge portion of bottom portion 114 within case 10.

As described above, elastic supporting parts 81 and 82 are clamped between end surfaces 527a and 528a of the upper and lower opening edge portions of coil bobbin part 52, on the one hand, and lid portion 12 and bottom portion 114 of case 10, on the other hand, so as to be disposed to extend in the direction orthogonal to the vibration direction. Further, movable body 20 is housed in coil bobbin part 52 around which coils 61 and 62 are wound, inner circumferential portions 802 of elastic supporting parts 81 and 82 are fixed to the upper and lower end portions of movable body 20, and outer circumferential fixing portions 806 of elastic supporting parts 81 and 82 are fixed to the upper end portion of coil bobbin part 52. Elastic supporting parts 81 and 82 are attached to coil bobbin part 52 such that the upper and lower openings in coil bobbin part 52 are closed.

Drive unit 13 in which the positional relationship between coils 61 and 62 and movable body 20 is defined is configured as described above, so that it becomes easier to disposed it in case 10.

Elastic supporting parts 81 and 82 include damping parts (dampers) 72 as a damping means for damping the vibration generated in elastic supporting part 81, which are attached to deformation arms 804 or to deformation arms 804 and outer circumferential fixing portions 806 in the present embodiment. The damping means reduces a resonant peak and generates a wide range of stable vibrations in elastic support 81.

Each of damping parts 72 of the present embodiment is disposed such that damping part 72 is partially inserted between spring portions (specifically, between outer circumferential fixing portion 806 and deformation arms 804) from one surface side of elastic supporting part 81 (82) and a damping-part main body is situated in an archlike manner between the spring portions. The damping part is fixed, by a thermosetting resin or an adhesive or the like which is not adhered to elastic supporting part 81, to elastic supporting part 81 (82) in such a manner as not to come off a gap between the spring portions of deformation arms 804. With this configuration, damping parts 72 damp a sharp spring resonance in elastic supporting part 81 (82), so as to make it possible to prevent a significant increase in vibrations at frequencies close to the resonance frequency and, thus, to prevent a greater difference in vibration from being caused between frequencies.

<Case 10>

Figure 8:
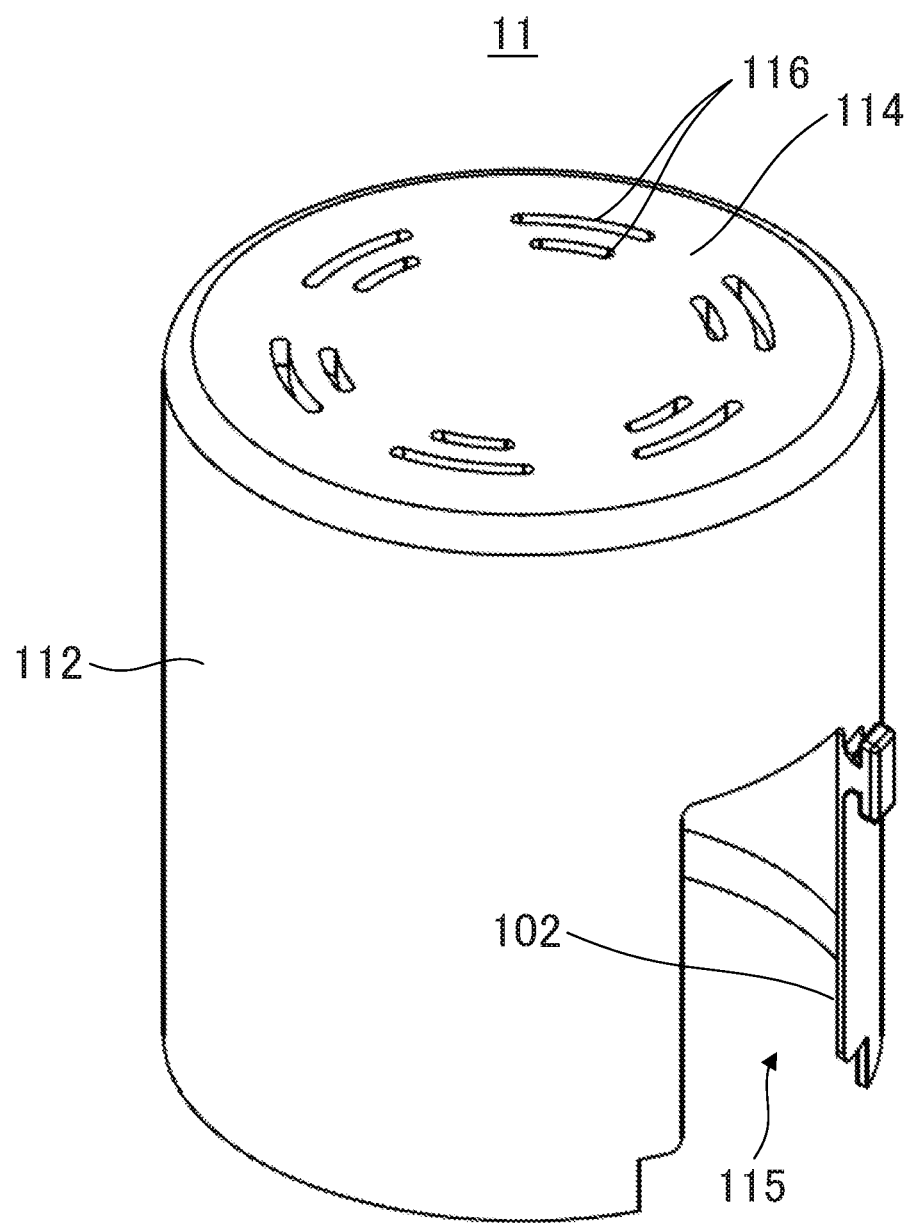
FIG. 8 is a bottom-surface-side perspective view of a case main body.
Figure 9:
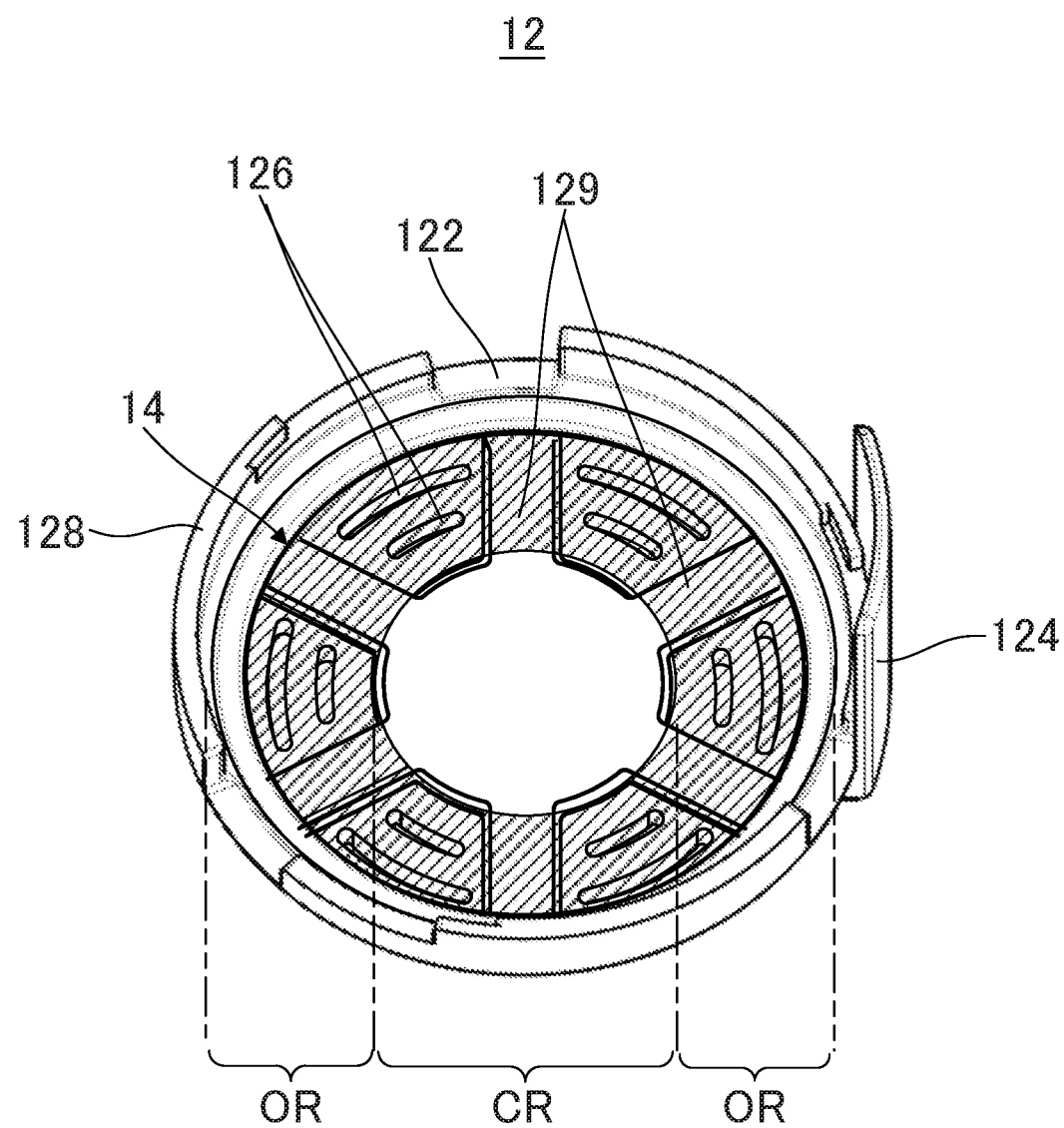
FIG. 9 illustrates a lid portion as seen from the back surface side.
Figure 10:
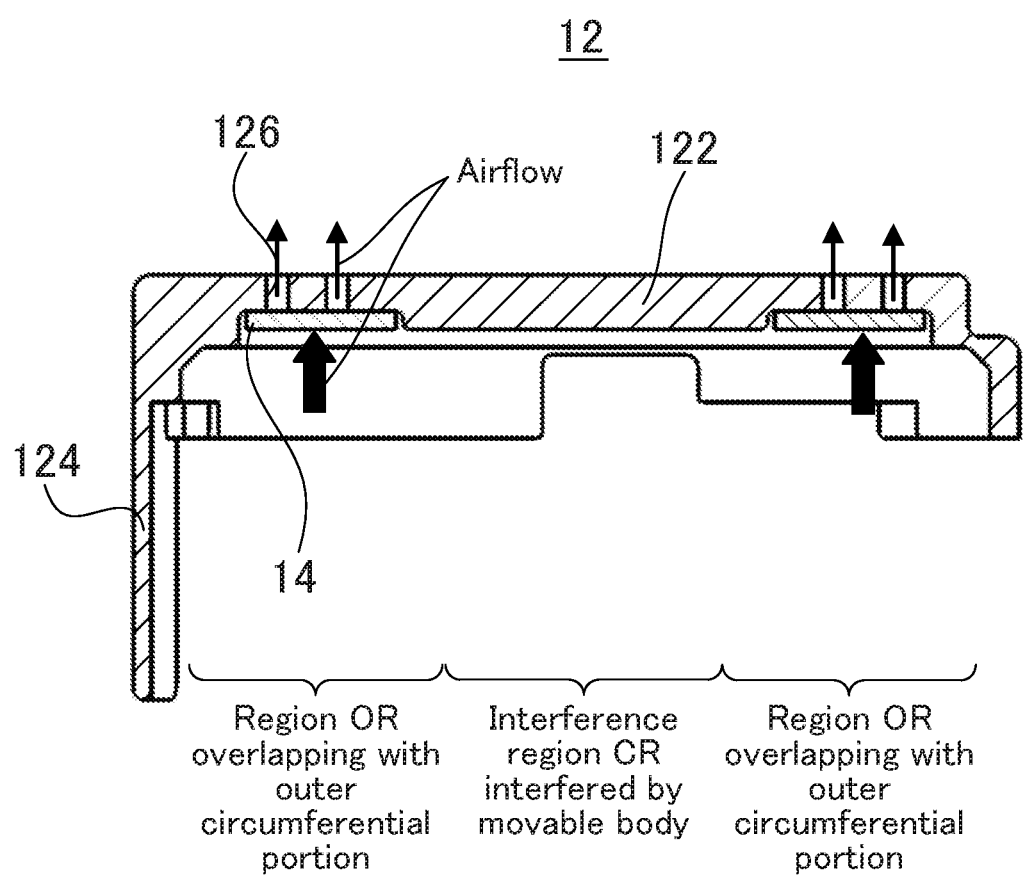
FIG. 10 is a sectional view illustrating vent holes in the lid portion.

FIG. 8 is a bottom-surface-side perspective view of case main body 11, FIG. 9 illustrates lid portion 12 as seen from the back surface side, and FIG. 10 is a sectional view of lid portion 12 illustrating vent holes 126 in top surface portion 122.

Case 10 includes: bottomed cylindrical case main body 11 having circumferential wall portion 112 and bottom portion 114; and lid portion 12 for closing opening portion 115 of case main body 11 as illustrated in FIGS. 1, 3, 9 and 10.

Case 10 includes at least one vent hole that releases compressed air formed by the reciprocating vibration of movable body 20 to the outside. In the present embodiment, case 10 includes a plurality of vent holes 126 and 116 that are formed in lid portion 12 and bottom portion 114 to extend through lid portion 12 and bottom portion 114, respectively.

Lid portion 12 and bottom portion 114 respectively form top surface portion 122 and the lower surface portion (bottom portion 114) that are opposite end surface portions of case 10 of vibration actuator 1 of the present embodiment. Bottom portion 114 is integrated with circumferential wall portion 112 into case main body 11, whereas lid portion 12 is positioned by engagement of hanging portion 124 that hangs from a portion of the outer circumference of top surface portion 122 with a cutout space formed in the upper end side of case main body 11. Lid portion 12 is fixed by welding to close the opening portion of circumferential wall portion 112 that is a cylindrical portion of case main body 11.

Top surface portion 122 and bottom portion 114 are disposed to face movable body 20 of drive unit 13 with a predetermined gap being interposed between the top surface portion and the bottom portion, on the one hand, and the movable body, on the other hand, in the vibration direction of movable body 20, so as to restrict the movement range of movable body 20 (i.e., to function as a movable-range reducing part that serves as a hard stop (movable range limitation) of movable body 20).

Specifically, top surface portion 122 and bottom portion 114 restrict the movable range formed by movable-range forming parts 54 in which the movable body is movable, (that is, the lengths from top surface portion 122 and bottom portion 114 to the edges of the upper and lower end portions of coil bobbin part 52 (end surfaces 527a and 528a upper and lower flange portions 527 and 528)). Case 10 forms a movable-body space, which is a space in which the movement of movable body 20 is restricted. Top surface portion 122 and bottom portion 114 define the movable-body space as the length in a range in which elastic supporting parts 81 and 82 do not plastically deform. Thus, even when a force causing movable body 20 to move beyond the movable range is applied on movable body 20, elastic supporting parts 81 and 82 make contact with fixing body 50 (at least one of lid portion 12 and bottom portion 114) without being plastically deformed, so that elastic supporting parts 81 and 82 are not damaged, and reliability can be increased.

<Vent Holes 116 and 126>

Vent holes 116 and 126 only have to be formed in at least one end surface portion of the opposite end surface portions (lid portion 12 and bottom portion 114) of case 10.

Vent holes 116 and 126 are formed in a portion of at least one end surface portion of the opposite end surface portions (lid portion 12 and bottom portion 114) of case 10 (in the present embodiment, in portions of both of lid portion 12 and bottom portion 114), which portion is free from interference by movable body 20 (region OR overlapping with the outer circumferential portion).

Here, the portion free from interference by movable body 20 (region OR overlapping with the outer circumferential portion) means a portion with which movable body 20 driven to linearly reciprocate in case 10 does not come into contact even when a large load is externally applied to case 10, such as when the actuator itself is dropped. In the present embodiment, movable body 20 is supported in case 10 by elastic supporting parts 81 and 82 so as to be suspended in the middle of case 10 and movable in the upper-lower direction. Accordingly, when a large load is externally applied to the movable body 20 supported to be freely movable in the vibration direction in case 10, the movable body 20 largely moves in the vibration direction to collide with bottom portion 114 or top surface portion 122 that is the movable-range reducing part. At this time, movable body 20 does not come into contact with (that is, does not interfere with) the outer circumferential portion (region OR overlapping with the outer circumferential portion) of bottom portion 114 or top surface portion 122, which is an elastic deformation region of elastic supporting parts 81 and 82, but collides with the central portion (interference region CR) of bottom portion 114 or top surface portion 122. As is understood, the portion free from interference by movable body 20 is a portion with which moving movable body 20 does not (is unlikely to) collide even when an external impact causes movable body 20 to move.

Vent holes 116 and 126 release, to the outside, compressed air formed in case 10 by the reciprocating vibration of movable body 20.

Vent holes 116 are formed in a portion of bottom portion 114 which overlaps with outer circumferential portion 807 of elastic supporting part 82 as seen in plan view in the moving direction of movable body 20 (specifically, mainly magnet 30 and movable-body cores 41 and 42). In other words, vent holes 116 are formed in the portion of bottom portion 114 of the opposite end surface portions (lid portion 12 and bottom portion 114) which overlaps with outer circumferential portion 807 of elastic support portion 82 in the vibration direction.

Vent holes 126 are formed in a portion of top surface portion 122 of lid portion 12 which overlaps with outer circumferential portion 807 of elastic supporting part 81 as seen in plan view in the moving direction of movable body 20 (specifically, mainly magnet 30 and movable-body cores 41 and 42). In other words, vent holes 126 are formed in the portion of top surface portion 122 of lid portion 12 of the opposite end surface portions (lid portion 12 and bottom portion 114) which overlaps with outer circumferential portion 807 of elastic support portion 81 in the vibration direction (the vent holes are formed in region OR overlapping with the outer circumferential portion).

Vent holes 116 and 126 are formed in portions of bottom portion 114 and top surface portion 122 of case 10 facing each other in the vibration direction, which portions are free from interference by movable body 20 (that is, in portions other than the vicinities of the centers of bottom portion 114 and top surface portion 122 as seen in plan view (other than interference region CR interfered by movable body 20)).

When vent holes 116 and 126 are formed in bottom portion 114 and top surface portion 122, the mechanical rigidity of the portions where vent holes 116 and 126 are formed is reduced. However, movable body 20 does not interfere with vent holes 116 and 126 of the present embodiment even when the vibration actuator is impacted externally and movable body 20 moves beyond the normal vibration range to collide with bottom portion 114 or top surface portion 122 both of which are the end surface portions. Therefore, bottom portion 114 and top surface portion 122 that are the end surface portions are not damaged (cracked or the like) due to the impact.

In vent holes 116 and 126, the total opening area (the sum of opening areas) of vent holes (126, 116) formed in case 10 is 2% or more and 20% or less of the surface area of at least one of top surface portion 122 and bottom portion 114. It is more preferable that the total opening area be 4% or more and 20% or less of the surface area of at least one of top surface portion 122 and bottom portion 114. Note that, vent holes 116 and 126 of the present embodiment are arc-shaped holes formed along the circumferences of disk-shaped top surface portion 122 and bottom portion 114 around their respective centers (substantially located on the central movability axis of vibration actuator 1), and are a plurality of holes formed to be arranged in the radial direction, but the vent holes may have any shape.

When the total opening area of vent holes 116 and 126 is less than 2% of the surface area of one of top surface portion 122 and bottom portion 114, the air in case 10 is less likely to be discharged to the outside when movable body 20 is being driven, so that the compressed air inside is difficult to be reduced and the movement of movable body 20 is damped.

Further, when the total opening area of vent holes 116 and 126 is greater than 20% of the surface area of one of top surface portion 122 and bottom portion 114, dust easily enters case 10 from the outside through the vent holes. This may hinder the movement of movable body 20, so that it is preferable that the total opening area of vent holes 116 and 126 be set to 20% at most of the surface area of one of top surface portion 122 and bottom portion 114.

Note that, a configuration in which air is made less likely to flow through the "gap" between inner circumferential surface 522a of bobbin main body 522 and magnet 30 during vibration of movable body 20, such as a configuration in which a magnetic fluid is provided in the "gap," is sometimes employed. In this case, it is more effective that the total opening area of vent holes 126 in top surface portion 122 is 2% or more and 20% or less of the surface area of top surface portion 122, and more preferably 4% or more and 20% or less. In this case, the total opening area of vent holes 116 in bottom portion 114 is 2% or more and 20% or less of the surface area of bottom portion 114, and preferably 4% or more and 20% or less.

Figure 15:
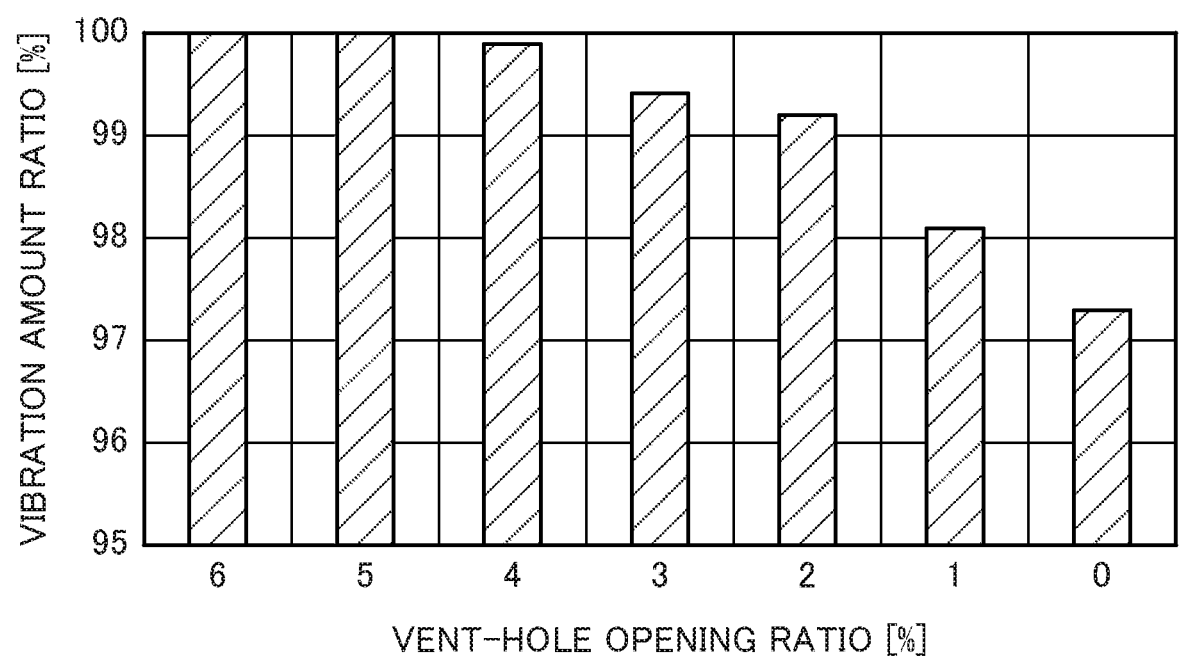
FIG. 15 illustrates the ratio corresponding to a vibration amount between the surface area of the lid portion and the opening area of the vent holes.

FIG. 15 illustrates the ratio corresponding to a vibration amount between the surface area of the lid portion and the opening area of the vent holes. In FIG. 15, the ratio between the surface area of lid portion 12, specifically, of top surface portion 122 and the total opening area of the plurality of vent holes 116 and 126 formed in top surface portion 122 and bottom portion 114 is indicated by the "vent-hole opening ratio (%)" based on a measurement result. As is clear from FIG. 15, when the "vent-hole opening ratio (%)" is 3% or less, the vibration amount ratio is reduced from 100% to a vibration ratio of about 99.5%. In contrast, when the "vent-hole opening ratio (%)" is 4% or more, the "vibration amount ratio (%)" is approximately 100%, and the vibration force of movable body 20 is obviously not attenuated.

Ribs 129 are formed on top surface portion 122 to surround vent holes 126, which prevent a decrease in strength of top surface portion 122 caused by formation of vent holes 126. Note that, like top surface portion 122, bottom portion 114 includes a plurality of radial ribs 129 on its surface facing top surface portion 122, and the plurality of vent holes 116 are formed between the plurality of ribs 129, but bottom portion 114 may also be free of the plurality of ribs.

At least top surface portion 122 out of bottom portion 114 and top surface portion 122 in which vent holes 116 and 126 are formed includes a plurality of radially-formed ribs. The plurality of vent holes 126 are formed in top surface portion 122 between the plurality of ribs. With this configuration, the radially disposed ribs can uniformly increase the strength of the outer circumferential portion of top surface portion 122 to prevent a decrease in strength of top surface portion 122 even when vent holes 126 are formed in top surface portion 122.

Further, on the surfaces of top surface portion 122 and bottom portion 114 which are situated on at least one sides, vent holes 116 and 126 may be provided with air-permeable mesh-shaped cushioning members. In the present embodiment, as illustrated in FIGS. 9 and 10, vent holes 126 in top surface portion 122 of lid portion 12 are covered by air-permeable cushioning member 14 disposed on the back surface side of top surface portion 122.

Cushioning member 14 illustrated in FIGS. 9 and 10 is preferably formed from, for example, a sponge material, and has a function as a damper capable of absorbing an impact force caused by collision by movable body 20 in the present embodiment. Although cushioning member 14 is formed on top surface portion 122 of lid portion 12 in an annular shape to cover vent holes 126 in the present embodiment, the present invention is not limited to this, and the central portion of top surface portion 122, that is, interference region CR interfered by movable body 20 may also be provided with cushioning member 14. In this case, the cushioning member disposed on the central portion functions as a damper against collision by movable body 20 caused when the vibration actuator is dropped, for example.

Figure 11:
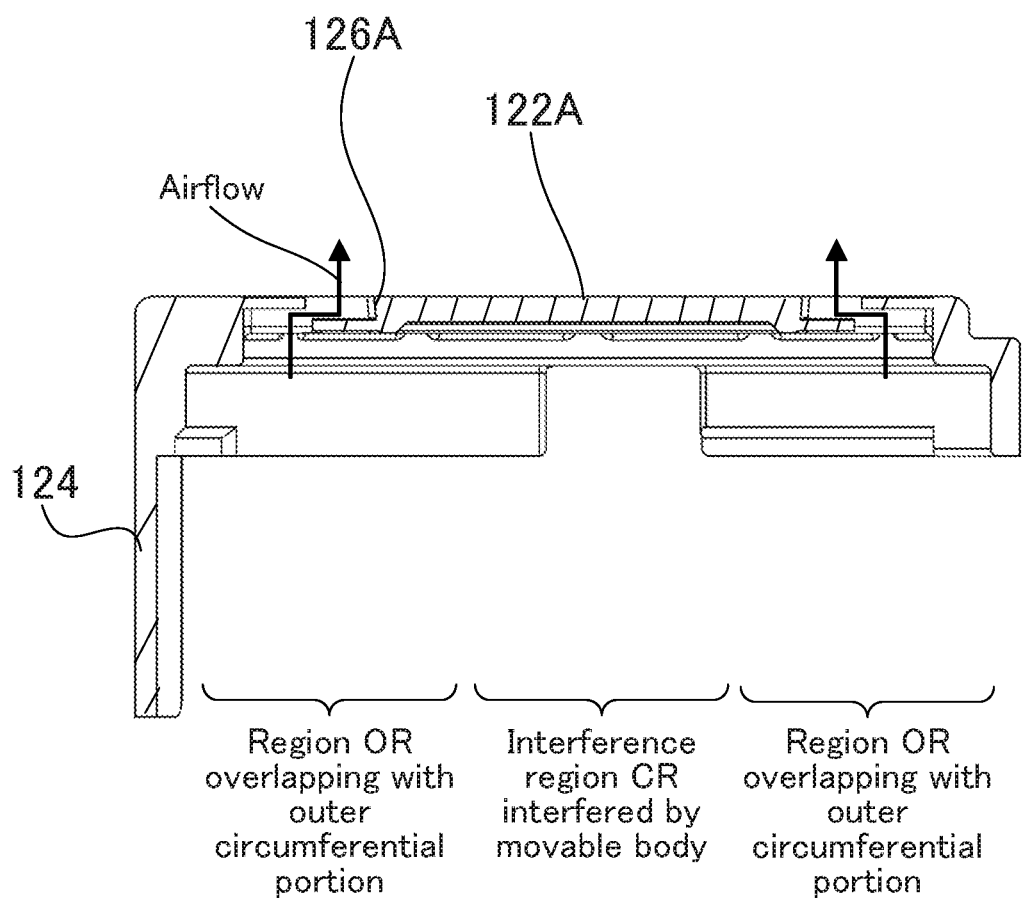
FIG. 11 is a sectional view illustrating a modification of the vent holes in the lid portion.

Note that, vent holes 126 may also be formed in top surface portion 122A of lid portion 12A in a sectional labyrinth shape like vent holes 126A illustrated in FIG. 11. As illustrated in the figure, in top surface portion 122A, vent holes 126A are formed not in a straight line in the upper-lower direction (vibration direction) but in the shape bending within the thickness of top surface portion 122A, so that it is possible to make it less likely for foreign matter such as dust or the like to enter the inside from the outside through top surface portion 122A. Vent holes 126A in this case are formed in disc-shaped top surface portion 122A as a plurality of slits radially disposed in region OR overlapping with the outer circumferential portion around the center of top surface portion 122A. Vent holes 126A are linearly formed in the radial direction as described above, but may also be formed in an arc shape along the circumferential direction like vent holes 126 of the present embodiment. Further, the configuration of vent holes 126A illustrated in FIG. 11 may be applied to vent holes 116 in bottom portion 114 of case 10 to form the vent holes in bottom portion 114 into the sectional labyrinth shape such that the same effect as brought about by vent holes 126A can be exerted. In addition, in a case where a vent hole is formed in circumferential wall portion 112 of case body 11, the vent hole may be covered with an air-permeable cushioning member and/or may be formed into the sectional labyrinth shape.

<Operation of Vibration Actuator 1>

A description will be given of operation of vibration actuator 1 in relation to one example in which magnet 30 is magnetized such that the side of front surface 30a, which is one side of magnet 30 in the magnetization direction (upper side in the present embodiment), is the N-pole, and the side of back surface 30b, which is the other side in the magnetization direction (lower side in the present embodiment), is the S-pole.

In vibration actuator 1, movable body 20 is considered to correspond to a mass in a vibration model of a spring-mass system, and a sharp peak is reduced by damping a vibration when a resonance is sharp (has a sharp peak). Damping the vibration makes the resonance less sharp, so that the maximum amplitude value and the maximum movement amount of movable body 20 at the time of resonance do not vary, and vibrations of the suitable and stable maximum movement amount are output.

Figure 14:
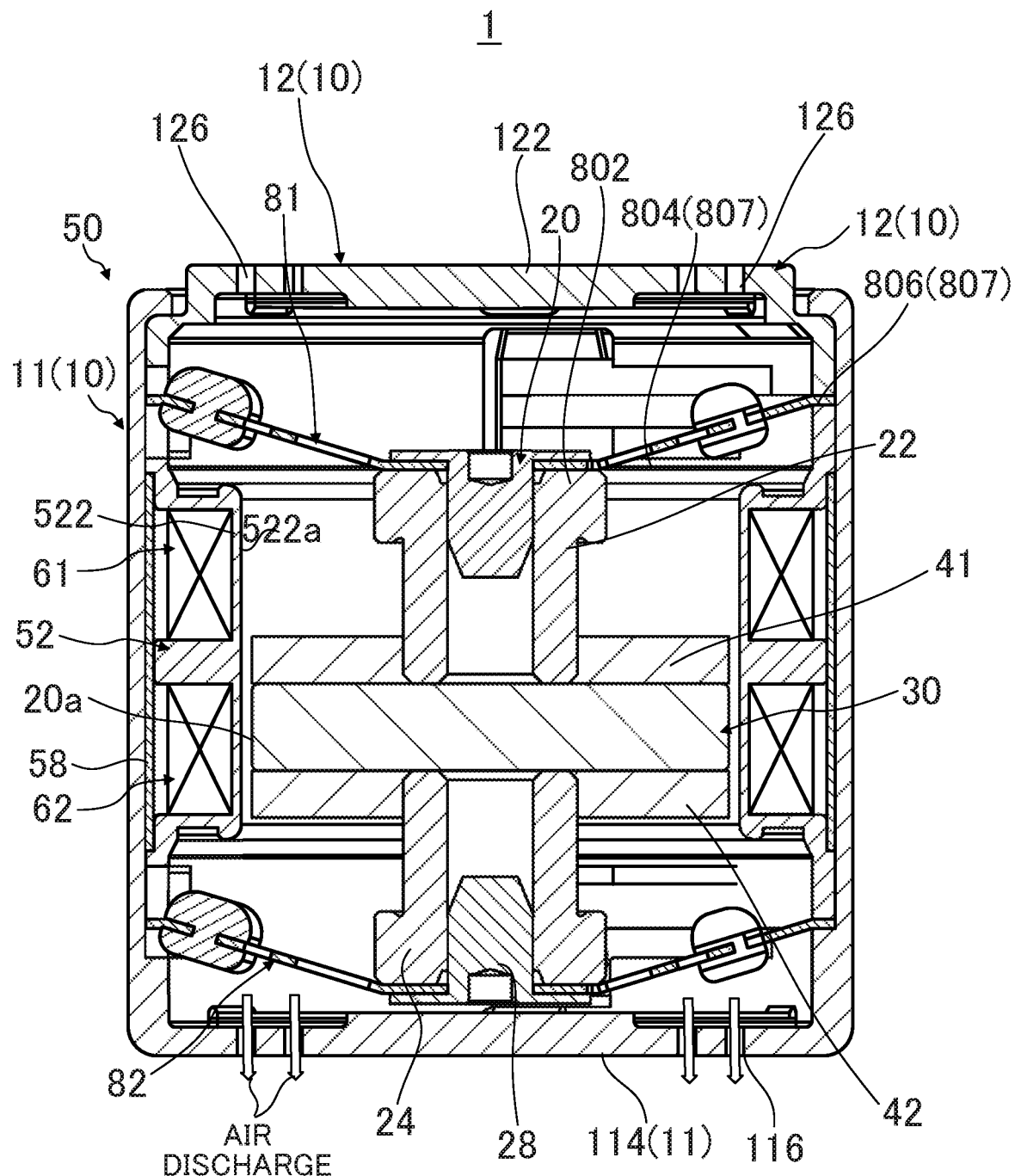
FIG. 14 illustrates a state of relative movement between the coil and the magnet.

The magnetic circuit illustrated in FIG. 14 is formed in vibration actuator 1. Further, in vibration actuator 1, coils 61 and 62 are disposed such that the coil axes are orthogonal to the magnetic flux of movable-body cores 41 and 42 and the like sandwiching magnet 30 in the vibration direction.

Specifically, flow mf of the magnetic flux is formed which is emitted from the side of surface 30a of magnet 30, emitted from movable-body core 41 to the side of coil 61, passes through electromagnetic shield part 58, and enters magnet 30 via coil 62 from lower movable-body core 42 of magnet 30.

Figure 12:
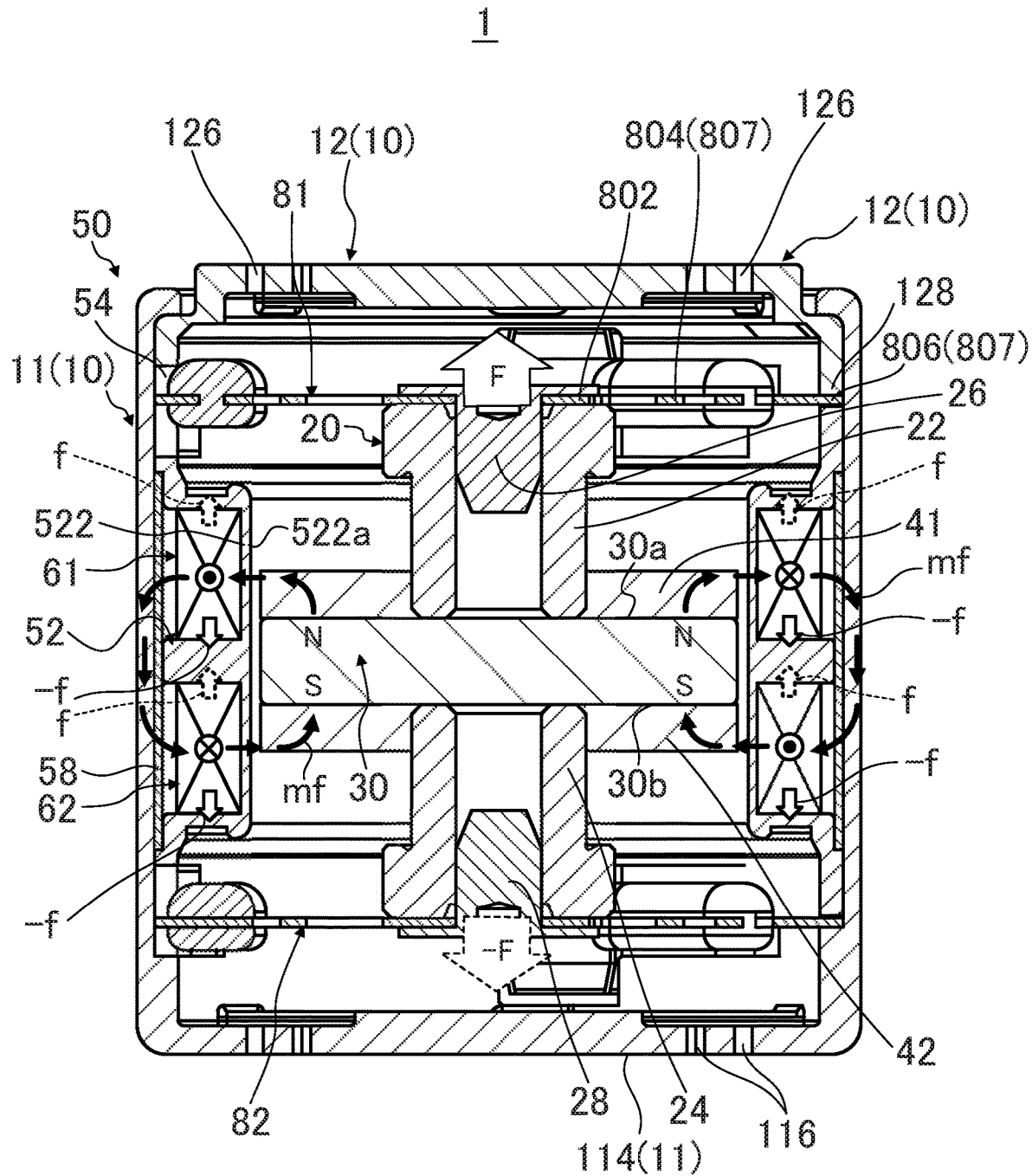
FIG. 12 schematically illustrates a magnetic circuit configuration of the vibration actuator.

Accordingly, when energization is performed as illustrated in FIG. 12, the Lorentz force in the −f direction is generated in coils 61 and 62 by interaction between the magnetic field of magnet 30 and the currents flowing through coils 61 and 62 in accordance with Fleming's left hand rule.

The Lorentz force in the −f direction is in a direction orthogonal to the direction of the magnetic field and to the direction of the current flowing through coils 61 and 62.

Figure 13:
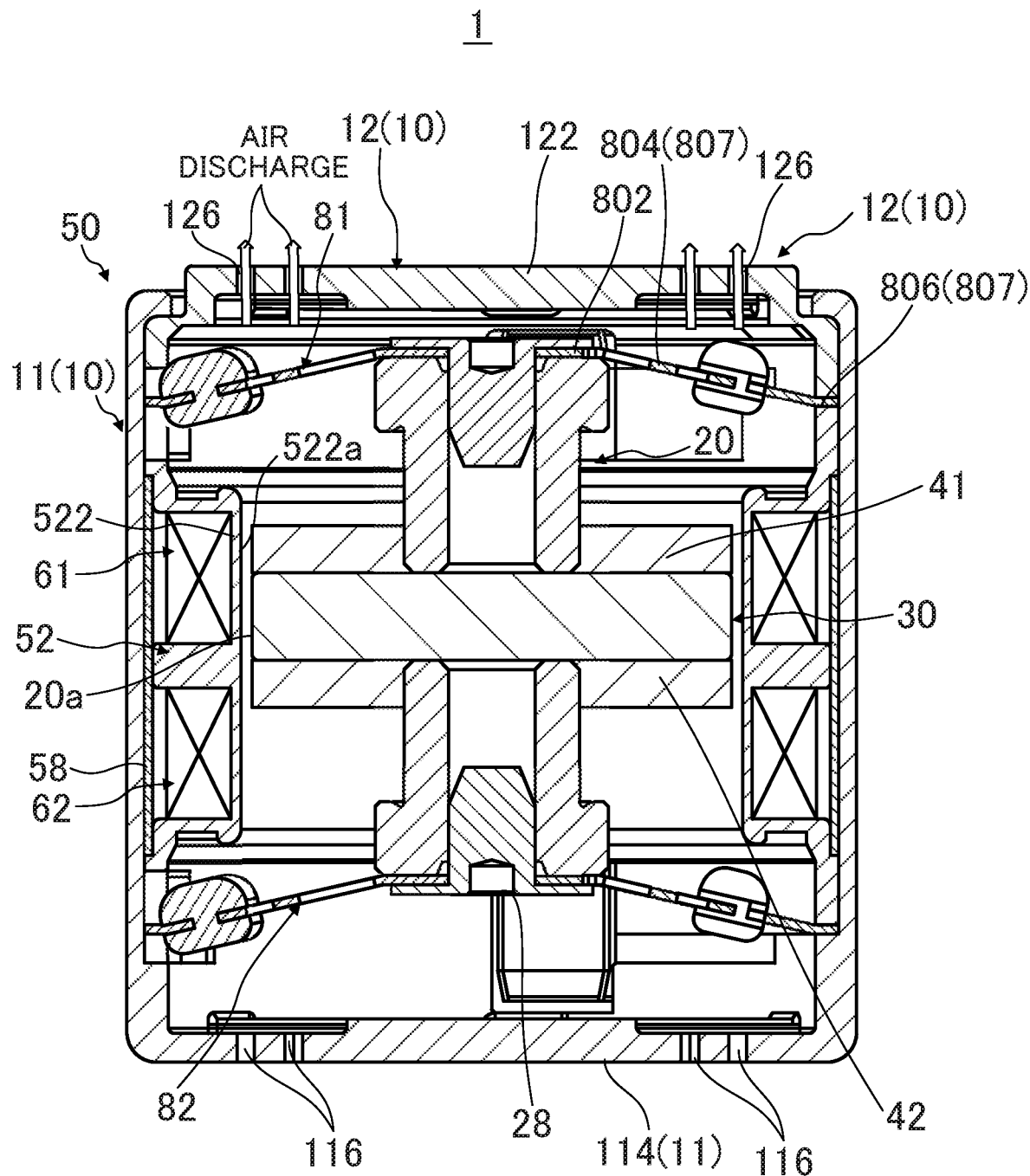
FIG. 13 illustrates a state of relative movement between a coil and a magnet.

Since coils 61 and 62 are fixed to fixing body 50 (coil bobbin part 52), the opposite force to this Lorentz force in the −f direction is generated in movable body 20 including magnet 30 as thrust in the F direction in accordance with the law of action and reaction. Thus, the side of movable body 20 including magnet 30 moves in the F direction, i.e., toward lid portion 12 (top surface portion 122 of lid portion 12) (see FIG. 13).

Further, when the energization direction of coils 61 and 62 is switched in the opposite direction and coils 61 and 62 are energized, the Lorentz force in the F direction reverse to the −f direction is generated. The generation of Lorentz force in this F direction causes in movable body 20 the force opposite to the Lorentz force in the F direction as thrust (thrust in the −F direction) in accordance with the law of action and reaction, so that movable body 20 moves in the −F direction, i.e., toward bottom portion 114 of fixing body 50 (see FIG. 14).

In vibration actuator 1, a magnetic attraction force acts between magnet 30 and electromagnetic shield part 58, which functions as a magnetic spring in a non-driven state in which vibration actuator 1 is not energized. The magnetic attraction force generated between magnet 30 and electromagnetic shield part 58 and a restoring force that brings elastic supporting parts 81 and 82 back to their original states cause movable body 20 to return to its original position.

Vibration actuator 1 includes: fixing body 50 including coils 61 and 62; and movable body 20 disposed radially inside coils 61 and 62 and including magnet 30 magnetized in the axial direction of coils 61 and 62. In addition, vibration actuator 1 includes flat plate-like elastic supporting parts 81 and 82 that elastically hold movable body 20 such that movable body 20 is freely movable in the vibration direction that is the coil-axis direction.

Further, coils 61 and 62 are disposed on the outer circumference of bobbin main-body portion 522 of coil bobbin part 52, outer circumferential surface 20a of movable body 20 is disposed on the inner circumferential side of bobbin main-body portion 522 with a gap being interposed between the outer circumferential surface of the movable body and the bobbin main-body portion, and coils 61 and 62 are, at the outer circumferential surface, surrounded by electromagnetic shield part 58.

Elastic supporting parts 81 and 82 support movable body 20 such that there is a predetermined gap between movable body 20 and inner circumferential surface 522a of bobbin main-body portion 522 in order that movable body 20 does not make contact with inner circumferential surface 522a in the non-vibration state and the vibration state of movable body 20.

In addition, hollow case 10 restricts the movement range of movable body 20 in case 10 by its opposite-end surface portions (top surface portion 122 and bottom portion 114) that are disposed to face each other at a distance from each other in the vibration direction of movable body 20. Case 10 includes one or more vent holes 126 (116). The total opening area of vent holes 126 is 2% or more and 20% or less of the surface area of at least one of top surface portion 122 and bottom portion 114.

It is thus possible to prevent the air from losing an outlet during the vibration of movable body 20 in case 10 and thus being compressed and dampening the vibration itself of movable body 20. That is, the air that is pressed between movable body 20 and top surface portion 122 and between movable body 20 and bottom portion 114 because of the vibration of movable body 20 in case 10 is discharged to the outside through vent holes 126 and 116. Thus, the movement of driven movable body 20 is not damped, and the entry of dust is also prevented, so that a suitable tactile vibration can be generated at high output.

Moreover, vibration actuator 1 has the configuration in which drive unit 13 is disposed in case 10, so that fixation of elastic supporting parts 81 and 82, which requires high dimensional accuracy, can be achieved by attaching elastic supporting parts 81 and 82 to coil bobbin part 52. Thus, arrangement of movable body 20 including the fixation of elastic supporting parts 81 and 82 can be determined with reference to coil bobbin part 52, so that it is possible to increase the accuracy of the vibration generation direction of the product.

Further, electromagnetic shield part 58 is attached to coil bobbin part 52 disposed in case 10 so as to surround coils 61 and 62, so that it is not necessary to dispose an electromagnetic shield on the outer circumferential side of case 10. Accordingly, the outer circumferential surface of circumferential wall portion 112 of case 10 is formed by a smooth surface of resin having a high surface accuracy, so that a preferable bonding state of a member for attachment of a cushioning material, for example, a double-sided tape, is achieved, and the joining strength can be increased.

In addition, case 10 is formed by bottomed cylindrical case main body 11 (that is, cup-shaped case main body 11) and lid portion 12, so that the number of parts is less than in a configuration in which circumferential wall portion 112 and bottom portion 114 are separate from each other, and it is possible to improve the assemblability and the impact resistance.

Further, lid portion 12 is welded and fixed to opening portion 115 of cup-shaped case main body 11. Thus, even when the plurality of vent holes 126 are formed in top surface 122 of lid portion 12, the durability is not reduced. Further, the fixation strength is greater than in the case of adhesive fixation. Lid portion 12 is less likely to come off case main body 11 even when externally impacted; that is, a higher impact resistance can be achieved. As described above, according to vibration actuator 1, it is possible to output a suitable tactile vibration to give the vibration to a user while preventing the entry of foreign matter such as dust without damping the vibration.

Vibration actuator 1 is driven by an AC wave input from the power supplying section (e.g., drive control section 203 illustrated in FIGS. 16 and 17) to coils 61 and 62. That is, the energization direction of coils 61 and 62 are periodically switched, and the thrust in the F direction toward top surface portion 122 of lid portion 12 and the thrust in the −F direction toward bottom portion 114 act alternately on movable body 20. Thus, movable body 20 vibrates in the vibration direction (a winding axis direction of coils 61 and 62 orthogonal to the radial direction of coils 61 and 62, or the magnetization direction of magnet 30).

Hereinbelow, brief descriptions of the driving principle of vibration actuator 1 will be given. In vibration actuator 1 of the present embodiment, movable body 20 vibrates with respect to fixing body 50 at resonance frequency $F_r$ [Hz] computed by following Equation 1 in which m [kg] denotes the mass of movable body 20 and $K_{sp}$ denotes the spring constant of the springs (elastic supporting parts 81 and 82 that are springs).

[1]

$$F_r = \frac{1}{2\pi}\sqrt{\frac{K_{sp}}{m}}$$ (Equation 1)

Since movable body 20 is considered as a mass in a vibration model of a spring-mass system, movable body 20 is brought into a resonance state when the AC wave of a frequency equal to resonance frequency $F_r$ of movable body 20 is input to coils 61 and 62. That is, movable body 20 can be efficiently vibrated by inputting the AC wave of a frequency being substantially equal to resonance frequency $F_r$ of movable body 20 to coils 61 and 62 from the power supplying section.

The equation of motion and the circuit equation representing the driving principle of vibration actuator 1 are shown below. Vibration actuator 1 is driven based on the equation of motion represented by following Equation 2 and based on the circuit equation represented by following Equation 3.

[2]

$$m\frac{d^2 x(t)}{dt^2} = K_f i(t) - K_{sp} x(t) - D\frac{dx(t)}{dt}$$ (Equation 2)

m: Mass [kg]
x(t): Displacement [m]
$K_f$: Thrust constant [N/A]
i(t): Current [A]
$K_{sp}$: Spring constant [N/m]
D: Damping coefficient [N/(m/s)]

[3]

$$e(t) = Ri(t) + L\frac{di(t)}{dt} + K_e \frac{dx(t)}{dt}$$ (Equation 3)

e(t): Voltage [V]
R: Resistance [Ω]
L: Inductance [H]
$K_e$: Counter electromotive force constant [V/(rad/s)]

That is, mass m [Kg], displacement x(t) [m], thrust constant $K_f$ [N/A], current i(t) [A], spring constant $K_{sp}$ [N/m], damping coefficient D [N/(m/s)], and the like of vibration actuator 1 may be changed appropriately as long as Equation 2 is satisfied. In addition, voltage e(t) [V], resistance R [Ω], inductance L [H], and counter electromotive force constant $K_e$ [V/(rad/s)] may be changed appropriately as long as Equation 3 is satisfied.

Accordingly, in vibration actuator 1, a great vibrational output can be obtained efficiently when the energization of coils 61 and 62 is performed using the AC wave corresponding to resonance frequency $F_r$ determined by mass m of movable body 20 and spring constant $K_{sp}$ of elastic supporting parts 81 and 82 that are leaf springs.

In addition, vibration actuator 1 satisfies Equations 2 and 3, and is driven by using a resonance phenomenon expressed using a resonance frequency indicated by Equation 1. Thus, in vibration actuator 1, the power consumed in a steady state is only loss caused by damping parts 72, so that vibration actuator 1 is capable of being driven with low power consumption, i.e., movable body 20 is capable of being linearly reciprocated with low power consumption. Further, vibrations in higher bands can be generated by increasing damping coefficient D.

According to the present embodiment, plate-like elastic supporting parts 81 and 82 are disposed above and below movable body 20, so that movable body 20 is stably driven in the upper-lower direction, and the magnetic flux of coils 61 and 62 can be efficiently distributed from upper and lower elastic supporting parts 81 and 82 above and below magnet 30. Thus, vibration actuator 1 is capable of achieving a high output vibration.

Further, fixing body 50 includes coil bobbin part 52 that serves a holding function of holding coils 61 and 62 and a protecting function of protecting coils 61 and 62 from movable body 20. Thus, even when fixing body 50 is impacted, fixing body 50 withstands the impact, and prevents damage such as deformation of elastic supporting parts 81 and 82. Further, fixing body 50 can also reduce damage to coils 61 and 62 since an impact is to be transmitted via bobbin main-body portion 522 formed from resin, so that highly reliable vibration actuator 1 is achieved.

(Electronic Device)

FIGS. 16 and 17 illustrate exemplary mounting configurations of vibration actuator 1. FIG. 16 illustrates an example in which vibration actuator 1 is mounted on game controller GC, and FIG. 17 illustrates another example in which vibration actuator 1 is mounted on mobile terminal M.

Game controller GC is connected to a game-machine main body by wireless communication, for example, and is used by a user gripping or holding it. Here, game controller GC has a rectangular plate shape, and the user grasps the left and right sides of game controller GC with both hands for operation.

Game controller GC notifies the user of a command from the game-machine main body by vibrations. Note that, game controller GC includes a function other than command notification (for example, an input operation section for input operation to the game-machine main body), which is not illustrated in the figures though.

Mobile terminal M is a portable communication terminal, such as a mobile phone or smartphone, for example. Mobile terminal M vibrates to notify a user of an incoming call from an external communication apparatus and also to implement functions of mobile terminal M (for example, functions of giving an operational feel and/or realism).

As illustrated in FIGS. 16 and 17, game controller GC and mobile terminal M each have communication section 201, processing section 202, drive control section 203, and vibration actuators 204, 205, and/or 206 each of which is vibration actuator 1 as a drive section. Note that, a plurality of vibration actuators 204 and 205 are mounted in game controller GC.

In game controller GC and mobile terminal M, it is preferable that vibration actuators 204, 205, and/or 206 be mounted such that the main surface of the terminal is parallel to the surfaces of vibration actuators 204, 205, and/or 206 (here, the bottom surface of bottom portion 114) which are orthogonal to the vibration direction. The main surface of the terminal is a surface that makes contact with the body surface of the user, and means 7a vibration transmission surface that makes contact with the body surface of the user to transmit vibrations in the present embodiment. Note that, the main surface of the terminal and the bottom surfaces of bottom portions 114 of vibration actuators 204, 205, and/or 206 may also be disposed to be orthogonal to one another.

Specifically, vibration actuators 204 and 205 are mounted in game controller GC such that the vibration direction is orthogonal to the surface with which the fingertip, the pad of the finger, the palm of the hand, and/or the like of the user operating the game controller make contact, or the surface on which the operation section is disposed. Further, in the case of mobile terminal M, vibration actuator 206 is mounted such that a display screen (touch panel surface) is orthogonal to the vibration direction. Thus, vibrations in a direction orthogonal to the main surface of game controller GC or mobile terminal M are transmitted to the user.

Communication section 201 is connected to an external communication apparatus by wireless communication, and receives a signal from the communication apparatus to output it to processing section 202. In the case of game controller GC, the external communication apparatus is a game-machine main body as an information communication terminal, and performs communication in accordance with short-range radio communication standards such as Bluetooth (registered trademark) and the like. In the case of mobile terminal M, the external communication apparatus is, for example, a base station, and performs communication in accordance with mobile communication standards.

Processing section 202 converts by using a conversion circuit section (not illustrated) an input signal into a driving signal for driving vibration actuators 204, 205, and/or 206, and outputs the driving signal to drive control section 203. Note that, in mobile terminal M, processing section 202 generates a driving signal based on a signal input from communication section 201 and on signals input from various functional sections (not illustrated; for example, an operation section such as a touch panel or the like).

Drive control section 203 is connected to vibration actuators 204, 205, and/or 206, and a circuit for driving vibration actuators 204, 205, and/or 206 is implemented in drive control section 203. Drive control section 203 supplies a drive signal to vibration actuators 204, 205, and/or 206.

Vibration actuators 204, 205, and/or 206 are driven in accordance with the drive signal from drive control section 203. Specifically, in vibration actuators 204, 205, and/or 206, movable body 20 vibrates in the direction orthogonal to the main surface of game controller GC or mobile terminal M.

Movable body 20 may make contact with top surface portion 122 of lid portion 12 or with bottom portion 114 via the dampers each time movable body 20 vibrates. In this case, an impact on top surface portion 122 of lid portion 12 or bottom portion 114 due to the vibration of movable body 20, i.e., the impact on the housing is directly transmitted as vibrations to the user. In particular, a plurality of vibration actuators 204 and 205 are mounted in game controller GC, so that it is possible to drive one of the plurality of vibration actuators 204 and 205 or both of the of vibration actuators 204 and 205 at the same time depending on the input drive signal.

Since the vibration in the direction orthogonal to the body surface of the user is transmitted to the body surface of the user in contact with game controller GC or mobile terminal M, a sufficient tactile vibration can be given to the user. Game controller GC is capable of giving a tactile vibration to the user with one or both of vibration actuators 204 and 205, so that application of vibrations with high vibrational expressiveness, such as selective application of at least strong or weak vibrations is possible.

While the invention made by the present inventor has been specifically described based on the preferred embodiment, it is not intended to limit the present invention to the above-mentioned preferred embodiment, but the present invention may be further modified within the scope and spirit of the invention defined by the appended claims.

For example, the vibration actuator according to the present invention is also suitable for application to portable devices other than game controller GC and mobile terminal M described in the embodiment. Examples of the portable devices other than game controller GC and mobile terminal M include a portable information terminal such as a tablet PC, a portable game terminal, and a wearable terminal worn and used by a user. In addition to the above-described portable devices, vibration actuator 1 of the present embodiment can also be used in an electric barber and beauty instrument such as a beauty massager requiring vibration.

INDUSTRIAL APPLICABILITY

The vibration actuator according to the present invention is capable of generating a suitable tactile vibration at high output while preventing the entry of foreign matter such as dust without damping the vibration, and is useful for being mounted in electronic devices such as a game machine terminal, a mobile terminal and the like which give a vibration to a user.

REFERENCE SIGNS LIST

1 Vibration actuator
10 Case
11 Case main body
12, 12A Lid portion
13 Drive unit
14 Cushioning member
20 Movable body
20a Outer circumferential surface
30 Magnet
30a Front surface
30b Back surface
41, 42 Movable-body core
50 Fixing body
52 Coil bobbin part (coil holding part)
52b, 52c Coil attachment portion
53 Terminal tying part (coil connection part)
54 Movable-range forming part
58 Electromagnetic shield part
61, 62 Coil
72 Damping part
81, 82 Elastic supporting part
112 Circumferential wall portion (cylindrical portion)
114 Bottom portion
115 Opening portion
116, 126, 126A Vent hole
118 Step portion
122, 122A Top surface portion
128 Pressing portion
129 Rib
201 Communication section
202 Processing section
203 Drive control section
204, 205, 206 Vibration actuator
222, 242 Joint portion
224, 244 Spring fixation portion
522 Bobbin main-body portion (coil protection wall portion)
522a Inner circumferential surface
526, 527, 528 Flange portion
527a Upper end surface 528a Lower end surface
802 Inner circumferential portion
804 Deformation arm
806 Outer circumferential fixing portion
807 Outer circumferential portion

What is claimed is:

1. A vibration actuator, comprising:
a fixing body including a hollow case and a coil disposed in the hollow case;
a movable body that includes a magnet disposed inside the coil in a radial direction of the coil, and is disposed to be freely movable in the hollow case in a vibration direction orthogonal to the radial direction; and
at least two or more leaf springs that support the movable body such that the movable body is freely movable with respect to the fixing body in the hollow case, wherein
cooperation between the coil and the magnet causes the movable body to vibrate with respect to the fixing body,
the hollow case includes opposite end surface portions that are disposed to face each other at a distance from each other in the vibration direction of the movable body,
the opposite end surface portions each include vent holes, and are each positioned to limit a movement range of a corresponding one of the at least two or more leaf springs to prevent plastic deformation when a force exceeding a range of movement during normal reciprocating vibration is applied to the movable body, and,
the vent holes are provided in an area between an outer circumference of a spring retaining part of the movable body and an outer circumferential portion of a corresponding one of the at least two or more leaf springs, the area being where the movable body does not collide with the corresponding one of the at least two or more leaf springs when the movable body moves, and the vent holes are each formed in an arc-shape around an axis of the movable body in a radial direction,
wherein
the vent holes are provided in each of the opposite end surface portions in such a manner that a ratio of a total opening area of the vent holes in one of the opposite end surface portions to a surface area of the one of the opposite end surface portions is between 2% and 20%, and
a ratio of a total opening area of the vent holes in another one of the opposite end surface portions to a surface area of the other one of the opposite end surface portions is between 2% and 20%.

2. The vibration actuator according to claim 1, wherein
the at least two or more leaf springs each comprises an annular outer circumferential fixing portion, which is joined to the fixing body, and an annular inner circumferential portion, which is joined to the movable body, and
the vent holes are formed in a portion of each end surface portion of the opposite end surface portions, the portion overlapping with an outer circumferential portion of a corresponding one of the at least two or more leaf springs in the vibration direction.

3. The vibration actuator according to claim 1, wherein
the fixing body includes a coil holding part that is disposed to surround the movable body and holds the coil,
the coil holding part includes a coil protection wall portion that is disposed inside the coil in the radial direction of the coil with a gap being interposed between the coil protection wall portion and the magnet, the coil protection wall portion inhibiting contact between the magnet and the coil,
the at least two or more leaf springs are each installed between the coil holding part and the movable body to sandwich the movable body in the vibration direction, and
the at least two or more leaf springs support the movable body such that, in a non-vibration state and in a vibration state of the movable body, the movable body is freely movable in the vibration direction without making contact with the coil holding part.

4. The vibration actuator according to claim 1, wherein
the vent holes are formed in at least one end surface portion of the opposite end surface portions in a sectional labyrinth shape.

5. The vibration actuator according to claim 1, wherein
the vent holes are, at a surface of at least one end surface portion of the opposite end surface portions which is situated on at least one side, covered with an air-permeable mesh-shaped cushioning member.

6. The vibration actuator according to claim 5, wherein
the surface situated on the at least one side is an inner surface of the hollow case, and
the air-permeable mesh-shaped cushioning member has a function of absorbing an impact caused by the movable body moving in the hollow case to come into contact with the air-permeable mesh-shaped cushioning member.

7. The vibration actuator according to claim 1, wherein
at least one end surface portion of the opposite end surface portions includes a rib surrounding the vent holes.

8. The vibration actuator according to claim 1, wherein
at least one end surface portion of the opposite end surface portions includes a plurality of ribs disposed radially, and
the vent holes are formed in at least one end surface portion between the plurality of ribs.

9. The vibration actuator according to claim 1, wherein
the hollow case includes a bottomed cylindrical case main body including a bottom portion and a cylindrical portion, the bottom portion being another end surface portion of the opposite end surface portions, the cylindrical portion being joined to the bottom portion and surrounding the movable body in the radial direction, and
at least one end surface portion of the opposite end surface portions is a lid portion fixed by welding so as to close an opening portion of the cylindrical portion of the bottomed cylindrical case main body.

10. An electronic device, in which
the vibration actuator according to claim 1 is mounted.

* * * * *